(12) United States Patent
Nolin et al.

(10) Patent No.: US 10,070,582 B2
(45) Date of Patent: Sep. 11, 2018

(54) STRING TRIMMER HEAD

(71) Applicant: TTI (Macao Commercial Offshore) Limited, Macau (MO)

(72) Inventors: Eric Nolin, Anderson, SC (US); Benjamin H. Cogan, Prosperity, SC (US); Robert L. Morrison, Shreveport, LA (US); Steve Coghill, Easley, SC (US)

(73) Assignee: TTI (MACAO COMMERCIAL OFFSHORE) LIMITED, Macau (MO)

( * ) Notice: Subject to any disclaimer, the term of this patent is extended or adjusted under 35 U.S.C. 154(b) by 0 days.

(21) Appl. No.: 15/134,256

(22) Filed: Apr. 20, 2016

(65) Prior Publication Data
US 2017/0303468 A1 Oct. 26, 2017

(51) Int. Cl.
*A01D 34/416* (2006.01)
(52) U.S. Cl.
CPC ....... *A01D 34/4166* (2013.01); *A01D 34/416* (2013.01)
(58) Field of Classification Search
CPC .......................... A01D 34/4166; A01D 34/416
See application file for complete search history.

(56) References Cited

U.S. PATENT DOCUMENTS

| | | |
|---|---|---|
| 2,538,230 A | 1/1951 | Boggs |
| 2,597,485 A | 5/1952 | Hillyer |
| 2,791,077 A | 5/1957 | Lyle |
| 3,708,967 A | 1/1973 | Geist et al. |
| 3,826,068 A | 7/1974 | Ballas et al. |
| 4,035,912 A | 7/1977 | Ballas et al. |
| 4,062,114 A | 12/1977 | Luick |
| 4,086,700 A | 5/1978 | Inada |
| 4,268,964 A | 5/1981 | Moore |
| 4,374,465 A | 2/1983 | Corner |
| 4,411,069 A | 10/1983 | Close et al. |

(Continued)

FOREIGN PATENT DOCUMENTS

| | | |
|---|---|---|
| CN | 104938135 | 9/2015 |
| DE | 2444610 | 4/1975 |

(Continued)

OTHER PUBLICATIONS

European Search Report for Application No. 17167417.9 dated Jul. 24, 2017 (9 pages).

(Continued)

*Primary Examiner* — Laura M Lee
(74) *Attorney, Agent, or Firm* — Michael Best & Friedrich LLP

(57) ABSTRACT

A trimmer head may include a housing rotatable about an axis; and a line holder supported by the housing. The line holder defines a first receptacle, a second receptacle separated from the first receptacle and an opening communicating with the first receptacle and the second receptacle. A line is supportable by the line holder, the line having a first end and an opposite second end, the line being folded to provide a first line section from the first end toward a folded portion and a second line section from the second end toward the folded portion, the folded portion being insertable into the opening, the first line section being received in the first receptacle, the second line section being received in the second receptacle.

18 Claims, 39 Drawing Sheets

(56) References Cited

U.S. PATENT DOCUMENTS

| | | |
|---|---|---|
| 4,513,563 A | 4/1985 | Roser et al. |
| 4,685,279 A | 8/1987 | Gullett |
| 4,726,176 A | 2/1988 | McGrew |
| 4,756,146 A | 7/1988 | Rouse |
| 4,805,306 A | 2/1989 | Baba |
| 4,819,416 A | 4/1989 | Jones |
| 4,852,258 A | 8/1989 | Foster |
| 4,856,194 A | 8/1989 | Lee |
| 4,905,465 A | 3/1990 | Jones et al. |
| 4,924,665 A | 3/1990 | Crosley |
| 4,936,884 A | 6/1990 | Campbell |
| 4,989,321 A | 2/1991 | Hoffmann |
| 5,010,649 A | 4/1991 | Hoffmann |
| 5,020,224 A | 6/1991 | Haupt |
| 5,023,998 A | 6/1991 | Masciarella et al. |
| 5,170,561 A | 12/1992 | Sepke |
| 5,197,264 A | 3/1993 | Lacey |
| 5,276,969 A | 1/1994 | Luick |
| 5,303,476 A | 4/1994 | Tuggle |
| 5,398,416 A | 3/1995 | MacKey |
| 5,433,006 A | 7/1995 | Taguchi |
| 5,526,572 A | 6/1996 | Sugihara et al. |
| 5,615,543 A | 4/1997 | Gaffey et al. |
| 5,640,836 A | 6/1997 | Lingerfelt |
| 5,651,418 A | 7/1997 | Jerez |
| 5,713,191 A | 2/1998 | Welton |
| 5,722,172 A | 3/1998 | Walden |
| 5,758,424 A | 6/1998 | Iacona et al. |
| 5,765,287 A | 6/1998 | Griffini et al. |
| 5,791,054 A | 8/1998 | Bessinger |
| D399,104 S | 10/1998 | Sutliff et al. |
| 5,836,227 A | 11/1998 | Dees, Jr. et al. |
| 5,845,405 A | 12/1998 | Rosdahl |
| 5,852,876 A | 12/1998 | Wang |
| 5,862,598 A | 1/1999 | Lee |
| 5,887,348 A | 3/1999 | Iacona et al. |
| 5,887,349 A | 3/1999 | Walden |
| 5,896,666 A | 4/1999 | Iacona et al. |
| 5,862,655 A | 5/1999 | Altamirano et al. |
| 5,901,448 A | 5/1999 | Lingerfelt |
| 5,970,693 A | 10/1999 | Ciaglo |
| 5,979,064 A | 11/1999 | Kitz et al. |
| 5,987,756 A | 11/1999 | Yates et al. |
| 6,035,618 A | 3/2000 | Fogle |
| 6,052,907 A | 4/2000 | Wang |
| 6,052,974 A | 4/2000 | Harb |
| 6,094,823 A | 8/2000 | Brown et al. |
| 6,108,914 A | 8/2000 | Sheldon |
| 6,112,416 A | 9/2000 | Bridges et al. |
| 6,119,350 A | 9/2000 | Sutliff et al. |
| 6,124,034 A | 9/2000 | Proulx et al. |
| 6,158,129 A | 12/2000 | Klein |
| 6,185,916 B1 | 2/2001 | Johnson |
| 6,240,643 B1 | 6/2001 | Civalleri |
| 6,314,848 B2 | 11/2001 | Morabit et al. |
| 6,347,455 B2 | 2/2002 | Brant et al. |
| 6,363,616 B1 | 4/2002 | Kreissle |
| 6,374,585 B1 | 4/2002 | Legrand |
| 6,401,344 B1 | 6/2002 | Moore et al. |
| 6,519,857 B1 | 2/2003 | Proulx et al. |
| 6,560,878 B2 | 5/2003 | Skinner et al. |
| 6,581,292 B2 | 6/2003 | Allis |
| 6,601,373 B1 | 8/2003 | Legrand |
| 6,666,009 B1 | 12/2003 | Brandon |
| 6,668,462 B2 | 12/2003 | Skinner et al. |
| 6,670,034 B2 | 12/2003 | Boyd et al. |
| 6,715,270 B1 | 4/2004 | Yandle, II |
| D496,840 S | 10/2004 | Iacona |
| 6,817,102 B2 | 11/2004 | Harris et al. |
| 6,827,152 B2 | 12/2004 | Iacona |
| 6,834,486 B2 | 12/2004 | Thompson et al. |
| 6,912,789 B2 | 7/2005 | Price |
| 6,928,741 B2 | 8/2005 | Proulx et al. |
| 6,944,954 B1 | 9/2005 | Ametoli |
| 6,944,956 B1 | 9/2005 | Fogle |
| 7,059,106 B2 | 6/2006 | Brandon |
| 7,257,898 B2 | 8/2007 | Iacona |
| 7,302,790 B2 | 12/2007 | Brandon |
| 7,543,387 B2 | 6/2009 | Legrand |
| 7,587,282 B2 | 9/2009 | Ranganathan et al. |
| 7,587,828 B2 | 9/2009 | Legrand |
| 7,603,782 B2 | 10/2009 | Jerez |
| 7,743,511 B2 | 6/2010 | Jerez |
| 7,829,002 B2 | 11/2010 | Legrand |
| 7,878,097 B2 | 2/2011 | Strader |
| 7,913,401 B2 | 3/2011 | Iacona |
| 8,028,424 B2 | 10/2011 | Legrand |
| 8,061,042 B2 | 11/2011 | Ametoli |
| 8,069,574 B2 | 12/2011 | Kato et al. |
| 8,069,758 B2 | 12/2011 | Zhang et al. |
| 8,307,558 B2 | 11/2012 | Alliss |
| 8,341,847 B2 | 1/2013 | Kato |
| D681,705 S | 5/2013 | Skinner |
| 8,434,389 B2 | 5/2013 | Castle |
| 8,464,431 B2 | 6/2013 | Reynolds et al. |
| 8,640,588 B2 | 2/2014 | Strader |
| 8,863,395 B2 | 10/2014 | Alliss |
| 8,925,206 B2 | 1/2015 | Cigarini |
| 8,973,274 B2 | 3/2015 | Proulx |
| 9,266,698 B2 | 2/2016 | Sheehy et al. |
| 2002/0073556 A1 | 6/2002 | Fogle |
| 2003/0188437 A1 | 10/2003 | Aliss |
| 2004/0237315 A1 | 12/2004 | Alliss |
| 2006/0026846 A1 | 2/2006 | Alliss |
| 2006/0048395 A1 | 3/2006 | Legrand |
| 2006/0053635 A1 | 3/2006 | Legrand |
| 2007/0084061 A1 | 4/2007 | Bennett |
| 2008/0141543 A1 | 6/2008 | Guerra |
| 2009/0038163 A1 | 2/2009 | Jerez et al. |
| 2010/0000099 A1 | 1/2010 | Ametoli |
| 2010/0101099 A1 | 4/2010 | Morabit |
| 2010/0154228 A1 | 6/2010 | Walls et al. |
| 2011/0289785 A1 | 12/2011 | Jerez |
| 2012/0066915 A1 | 3/2012 | Alliss |
| 2012/0246945 A1 | 10/2012 | Harless et al. |
| 2012/0297626 A1 | 11/2012 | Skinner et al. |
| 2013/0152359 A1 | 6/2013 | Jerez |
| 2013/0283623 A1 | 10/2013 | Pellenc |
| 2014/0202009 A1 | 7/2014 | Proulx |
| 2014/0338202 A1 | 11/2014 | Morabit |
| 2015/0201557 A1* | 7/2015 | Jerez ................... A01D 34/416 30/276 |
| 2015/0264862 A1 | 9/2015 | Skinner |
| 2015/0282425 A1 | 10/2015 | Skinner |
| 2015/0289446 A1 | 10/2015 | Duvall |
| 2015/0327436 A1 | 11/2015 | Skinner et al. |
| 2015/0342117 A1 | 12/2015 | Alliss |
| 2015/0351319 A1 | 12/2015 | Skinner et al. |
| 2015/0366131 A1 | 12/2015 | Skinner |
| 2016/0007528 A1 | 1/2016 | Skinner |

FOREIGN PATENT DOCUMENTS

| | | |
|---|---|---|
| EP | 0132385 | 1/1985 |
| EP | 0683969 | 11/1995 |
| EP | 0970596 | 1/2000 |
| EP | 1749429 | 2/2007 |
| GB | 1583521 | 1/1981 |
| GB | 2214048 | 8/1989 |
| NL | 8302111 | 1/1985 |
| WO | 9818312 | 5/1998 |
| WO | 2003013217 | 2/2003 |
| WO | 2004064489 | 8/2004 |
| WO | 2004064491 | 8/2004 |
| WO | 2004064492 | 8/2004 |
| WO | 2004064493 | 8/2004 |

(56) References Cited

FOREIGN PATENT DOCUMENTS

| WO | 2004064494 | 8/2004 |
| WO | 2008139246 | 11/2008 |
| WO | 2008153990 | 12/2008 |
| WO | 2010040022 | 4/2010 |
| WO | 2014025799 | 2/2014 |

OTHER PUBLICATIONS

Sanyo Monofilament, Trimmer line, <http://www.sanyo-line.com/english/products/trimmer-line/index.html> website available as early as May 25, 2007.

* cited by examiner

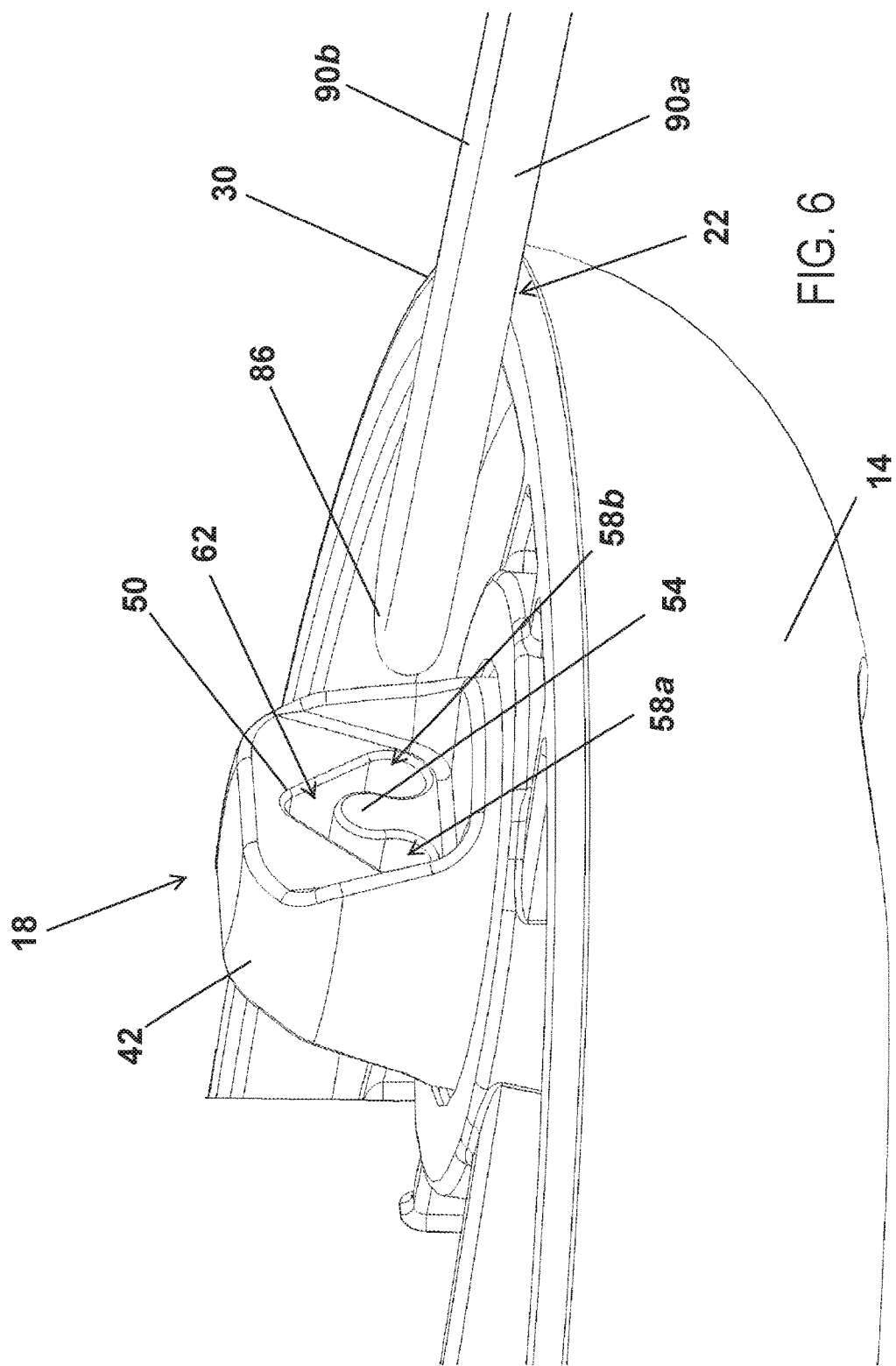

STRING TRIMMER HEAD

FIELD

The present invention relates to trimmers and, more particularly, to trimmer heads and line holders for string trimmers.

SUMMARY

Generally, trimmers are used to cut grass and weeds, and are often used to edge around trees, near fences and walls, and along landscape borders. Conventional string trimmers include an elongated shaft with a rotating element or gear head near the end of the elongated shaft, and a spool or string head is attached to the gear head. Typically, the string head includes a trimmer line that is rotated by the gear head for cutting and trimming along landscaped areas, fences, and walls.

In one independent aspect, a trimmer head for use with a trimmer may generally include a housing rotatable about an axis; a line holder supported by the housing, the line holder defining a first receptacle, a second receptacle separated from the first receptacle and an opening communicating with the first receptacle and the second receptacle; and a line supportable by the line holder, the line having a first end and an opposite second end, the line being folded to provide a first line section from the first end toward a folded portion and a second line section from the second end toward the folded portion, the folded portion being insertable into the opening, the first line section being received in the first receptacle, the second line section being received in the second receptacle.

In another independent aspect, a line holder for a trimmer head may generally include a body defining a first receptacle, a second receptacle separated from the first receptacle and an opening communicating with the first receptacle and the second receptacle, the body including a projection separating the first receptacle from the second receptacle, a line being supportable by the line holder, the line having a first end and an opposite second end, the line being folded to provide a first line section from the first end toward a folded portion and a second line section from the second end toward the folded portion, the folded portion being insertable into the opening and positionable around the projection, the first line section being received in the first receptacle, the second line section being received in the second receptacle.

In yet another independent aspect, a method of assembling a trimmer head may be provided. The head may include a housing, a line holder and a line, the housing being rotatable about an axis and having an outer periphery, the line holder defining a first receptacle, a second receptacle separated from the first receptacle and an opening communicating with the first receptacle and the second receptacle, the body including a projection separating the first receptacle from the second receptacle, the line having a first end and an opposite second end. The method may generally include supporting the line holder on the housing; folding the line to provide a first line section from the first end toward a folded portion and a second line section from the second end toward the folded portion; inserting, from beyond the outer periphery, the folded portion into the opening; and thereafter, positioning the folded portion around the projection, the first line section in the first receptacle and the second line section in the second receptacle.

Other independent aspects of the invention will become apparent by consideration of the detailed description, claims and accompanying drawings.

BRIEF DESCRIPTION OF THE DRAWINGS

FIG. 6 is a top perspective view of a portion of the head of FIG. 2 illustrating the line removed from the line holder.

DETAILED DESCRIPTION

Before any independent embodiments of the invention are explained in detail, it is to be understood that the invention is not limited in its application to the details of construction and the arrangement of components set forth in the following description or illustrated in the following drawings. The invention is capable of other independent embodiments and of being practiced or of being carried out in various ways. Also, it is to be understood that the phraseology and terminology used herein is for the purpose of description and should not be regarded as limiting.

Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof.

Figure 1:
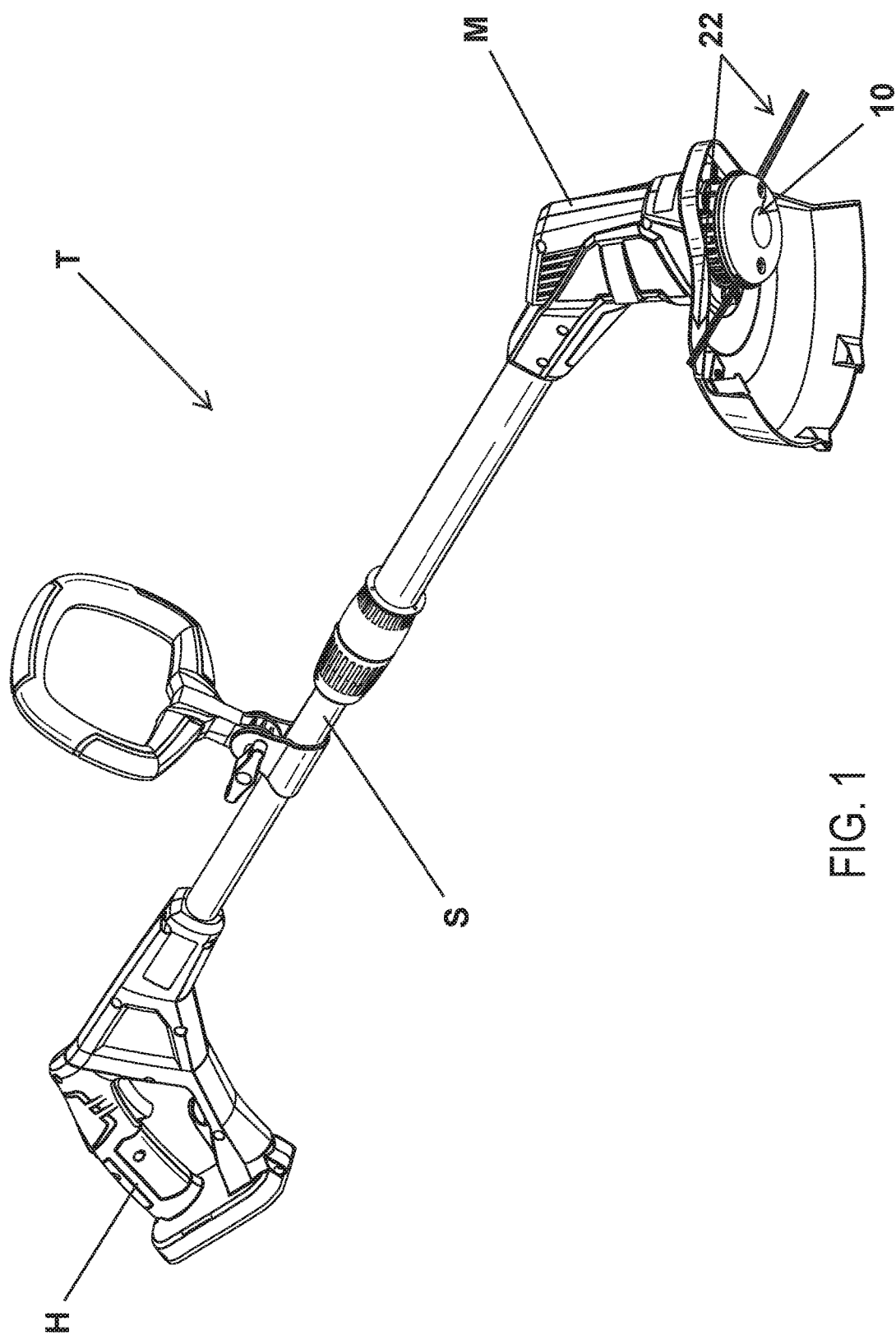
FIG. 1 is a perspective view of a trimmer, such as a string trimmer, for use with a trimmer head.
Figure 2:
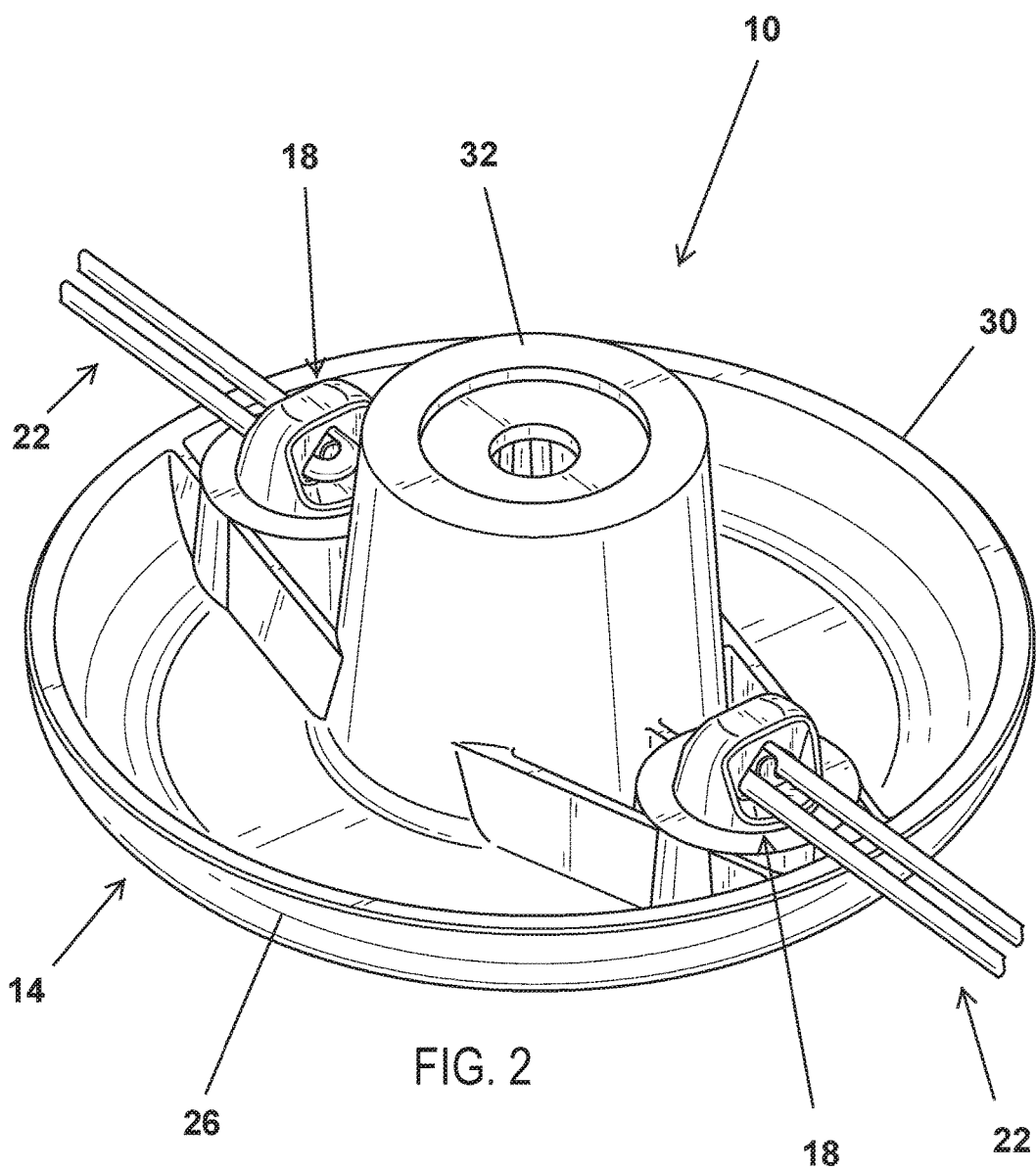
FIG. 2 is a top perspective view of a trimmer head for use with the trimmer shown in FIG. 1.
Figure 3:
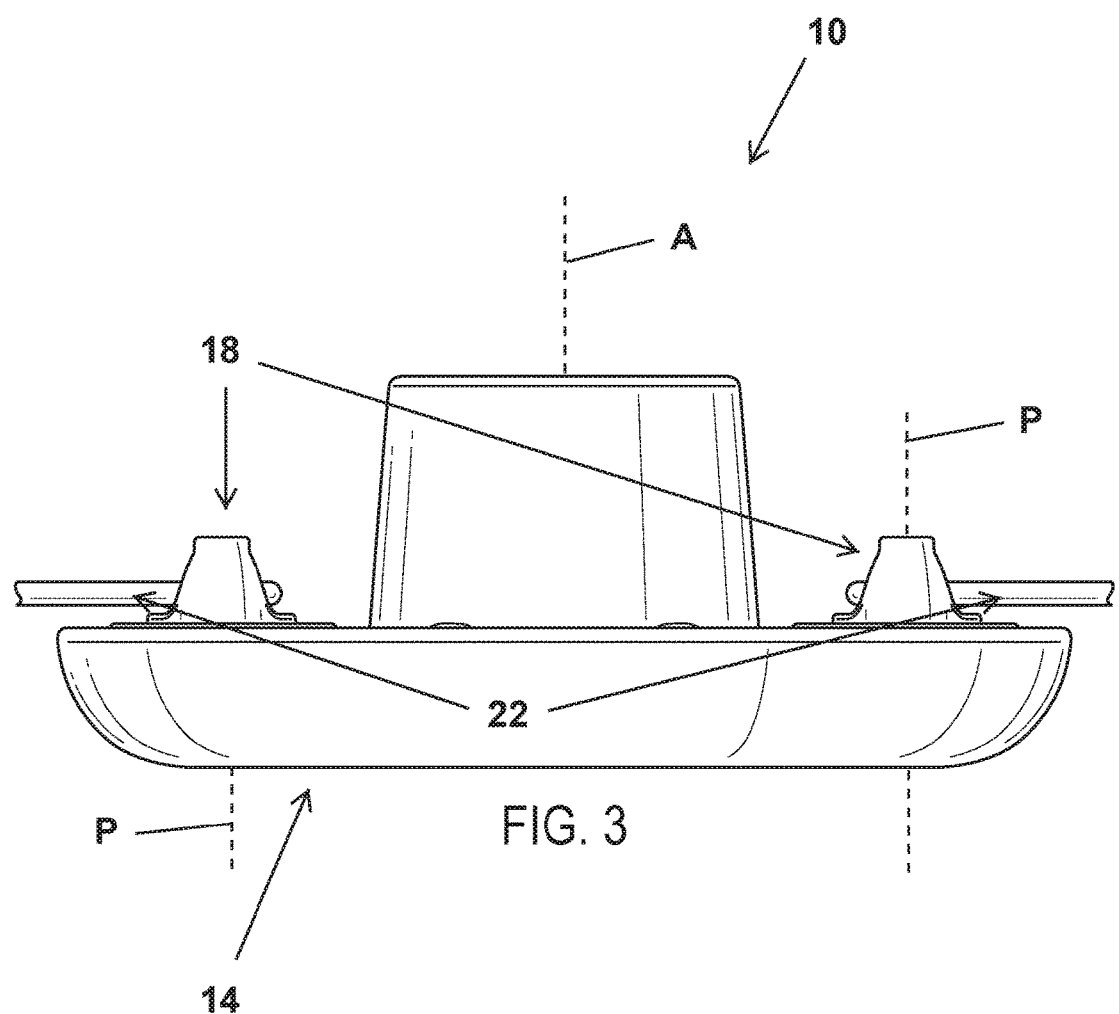
FIG. 3 is a side view of the head shown in FIG. 2.
Figure 4:
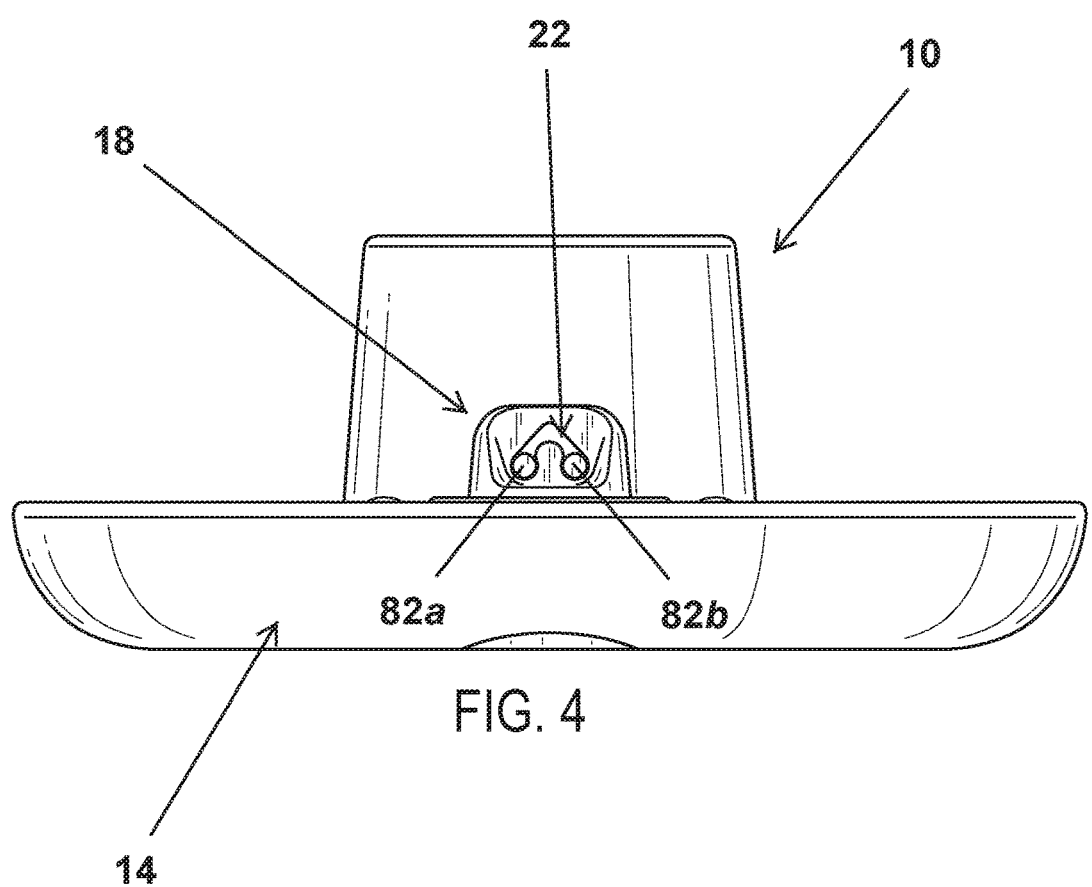
FIG. 4 is an end view of the head shown in FIG. 2.
Figure 5:
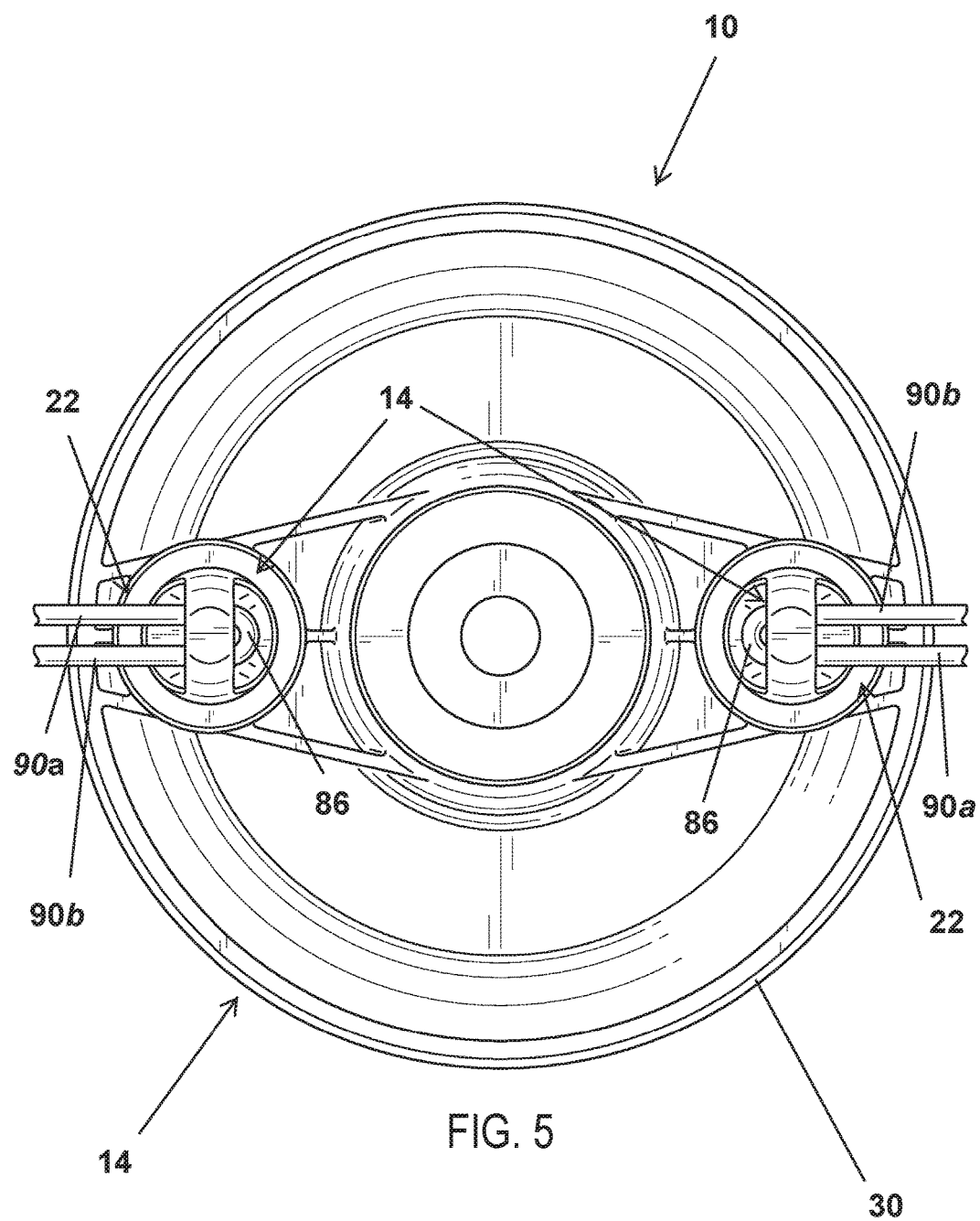
FIG. 5 is a top view of the head of FIG. 2.
Figure 7A:
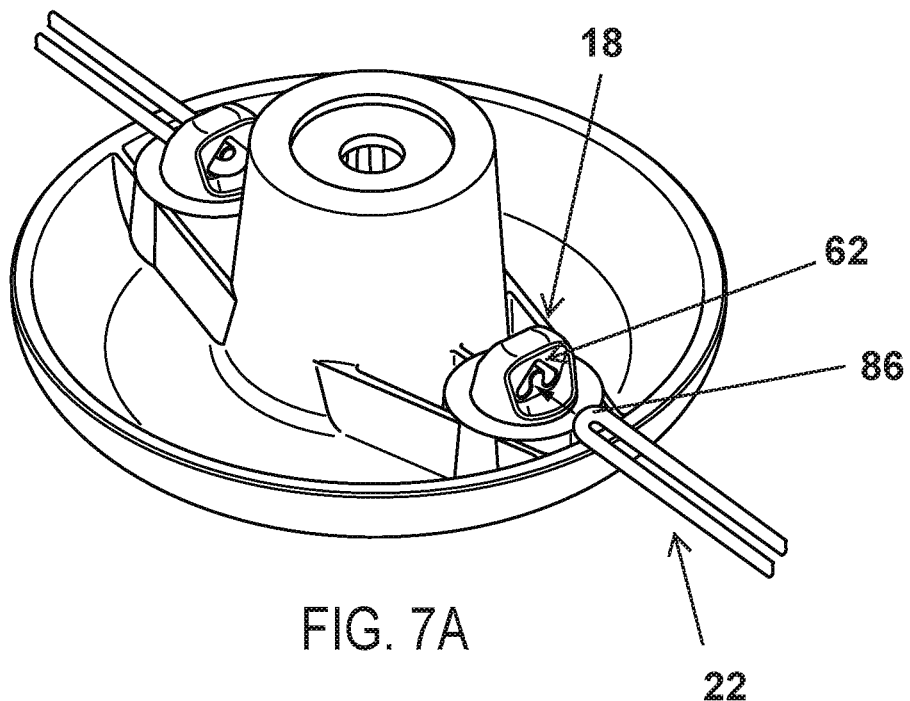
FIGS. 7A-7B are top perspective views of the head of FIG. 2 illustrating insertion of the line.
Figure 7B:
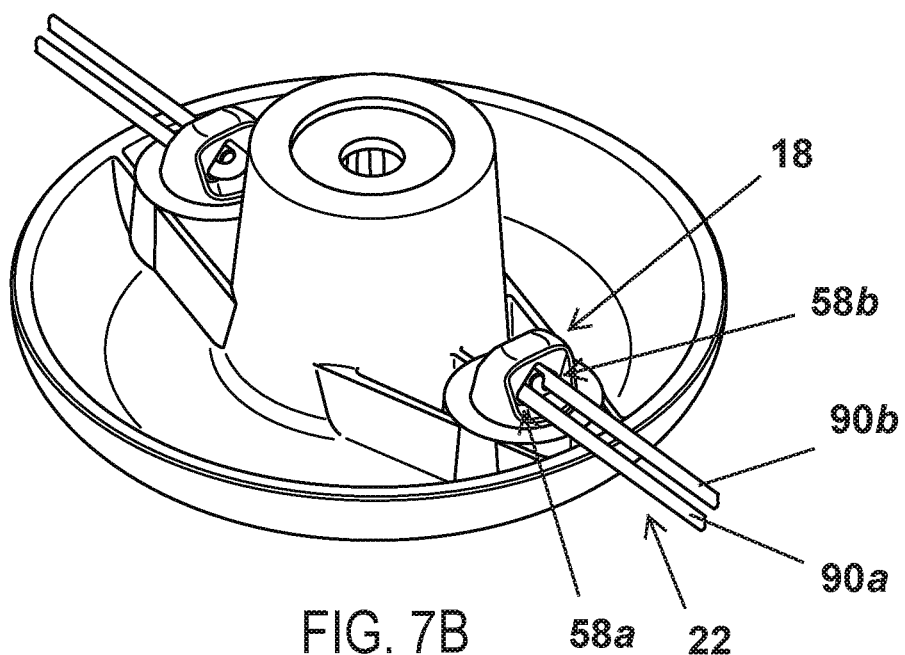
Figure 8A:
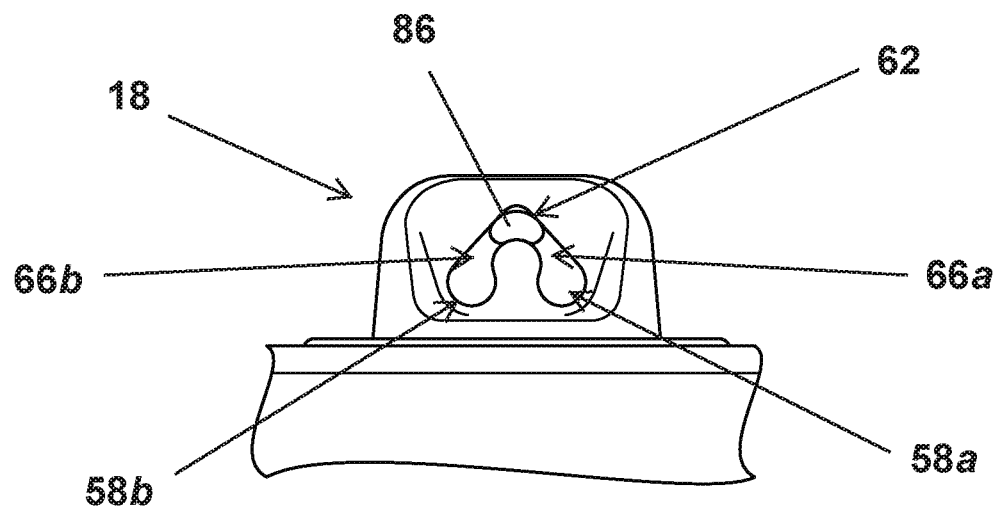
FIGS. 8A-8B are views of the rear face of the line holder of the head of FIG. 2 illustrating insertion of the line.
Figure 8B:
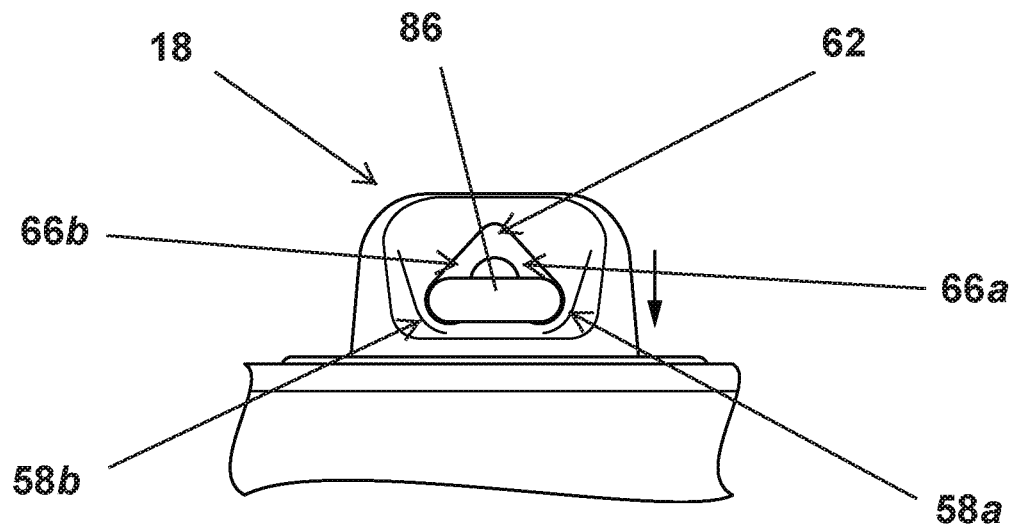

FIGS. 2-9 illustrate a trimmer head 10 for use on an exemplary string trimmer T shown in FIG. 1. The trimmer T generally includes a shaft S with a handle H toward one end and a motor housing M enclosing an electric motor (not shown) with a motor-driven output or drive shaft (not shown) for connection to a trimmer head on the other end. Various powered trimmers (e.g., battery-powered, gas-powered, etc.) may be used with the trimmer head 10.

As illustrated in FIGS. 2-8, the trimmer head 10 includes a housing 14 supporting one or more line holders 18 (two in the illustrated construction). Each line holder 18 is operable to selectively retain a folded trimmer line 22 for cutting vegetation during operation of the trimmer T and rotation of the head 10.

The housing 14 includes a wall 26 extending to an outer periphery 30. A cylindrical projection 32 is connected to the drive shaft of the trimmer T via attachment structure (not shown) to cause rotation of the trimmer head 10 about an axis A. The housing 14 defines (see FIGS. 9-12) an opening 34 for each line holder 18, and a rim 38 is provided about each opening 34.

The line holder 18 is illustrated in more detail in FIGS. 13-18. Each line holder 18 includes a body 42 and a post 46. The body 42 includes (see FIG. 15) a wall 50 and a projection 54 cooperating to define line receptacles 58a, 58b and an opening 62. The projection 54 separates the receptacles 58a, 58b, and the opening 62 communicates with the receptacles 58a, 58b through respective passages 66a, 66b.

The receptacles 58a, 58b, the opening 62 and the projection 54 are generally arranged in an inverted V shape. The wall 50 converges from each receptacle 58a, 58b towards the opening 62. Also, on each side, the illustrated projection 54 defines an undercut 70a, 70b.

As illustrated, the construction of the wall 50 and the projection 54 define each receptacle 58a, 58b to narrow into the associated passage 66a, 66b and in a direction at an angle relative to the pivot axis P. The illustrated line holder 18 is symmetrical relative to a plane defined by the page in FIG. 15 such that either face of the line holder 18 (e.g., the face illustrated in FIG. 15 or the opposite face (not shown)) may be oriented toward the outer periphery 30.

Figure 9:
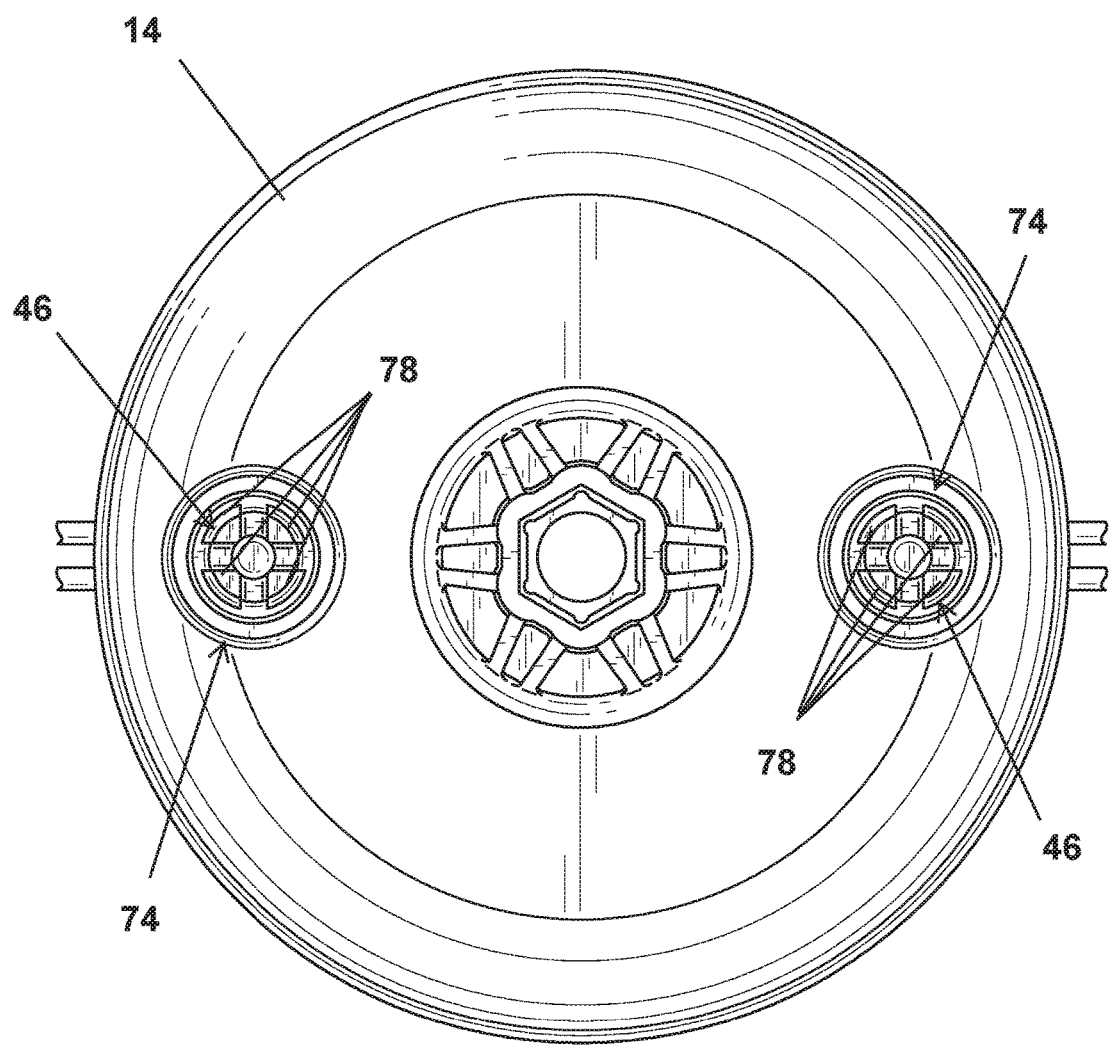
FIG. 9 is a bottom view of the head of FIG. 2.
Figure 10:
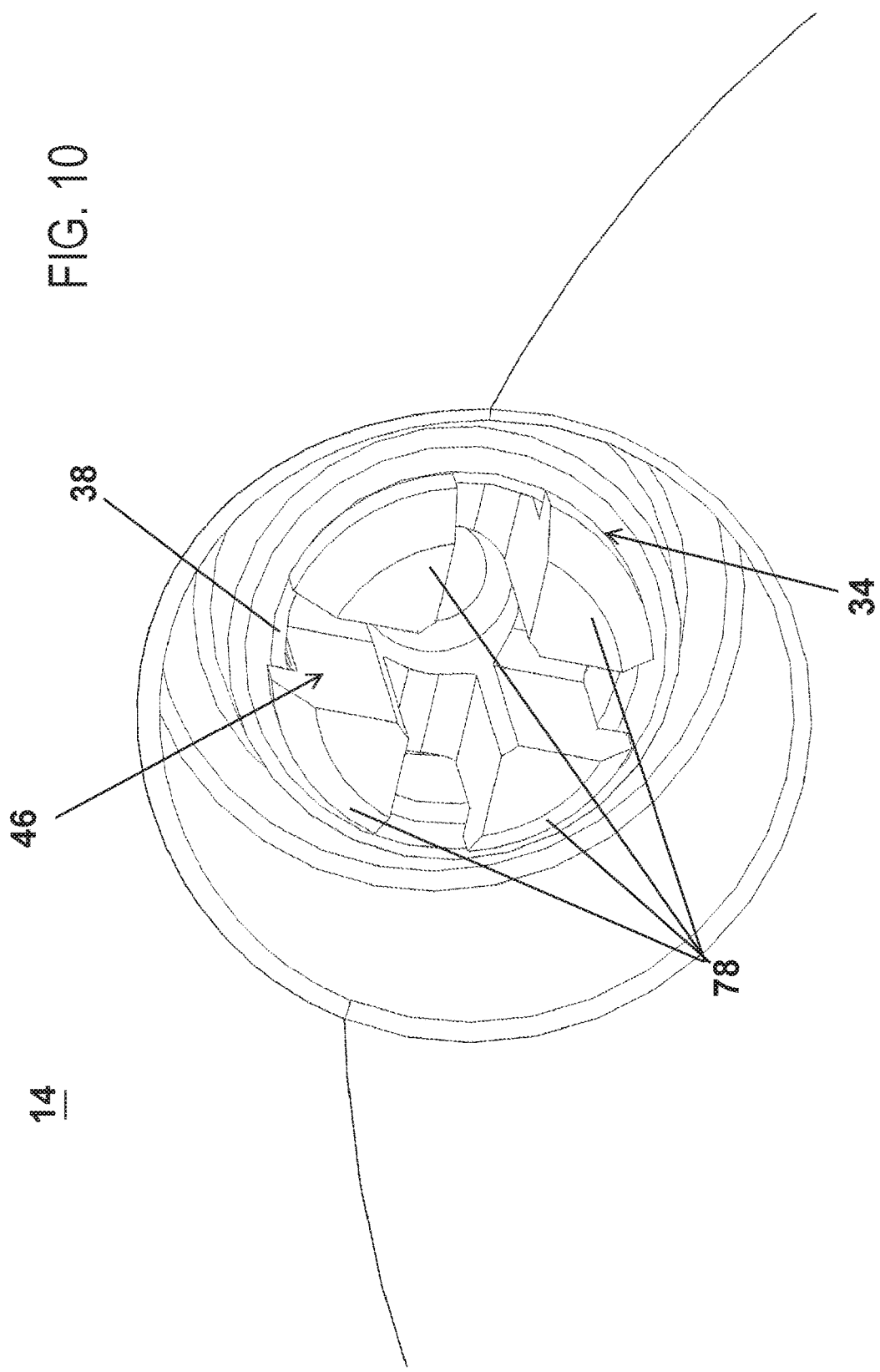
FIG. 10 is a bottom perspective view of an enlarged portion of the head of FIG. 2 illustrating a retainer for the line holder.
Figure 11:
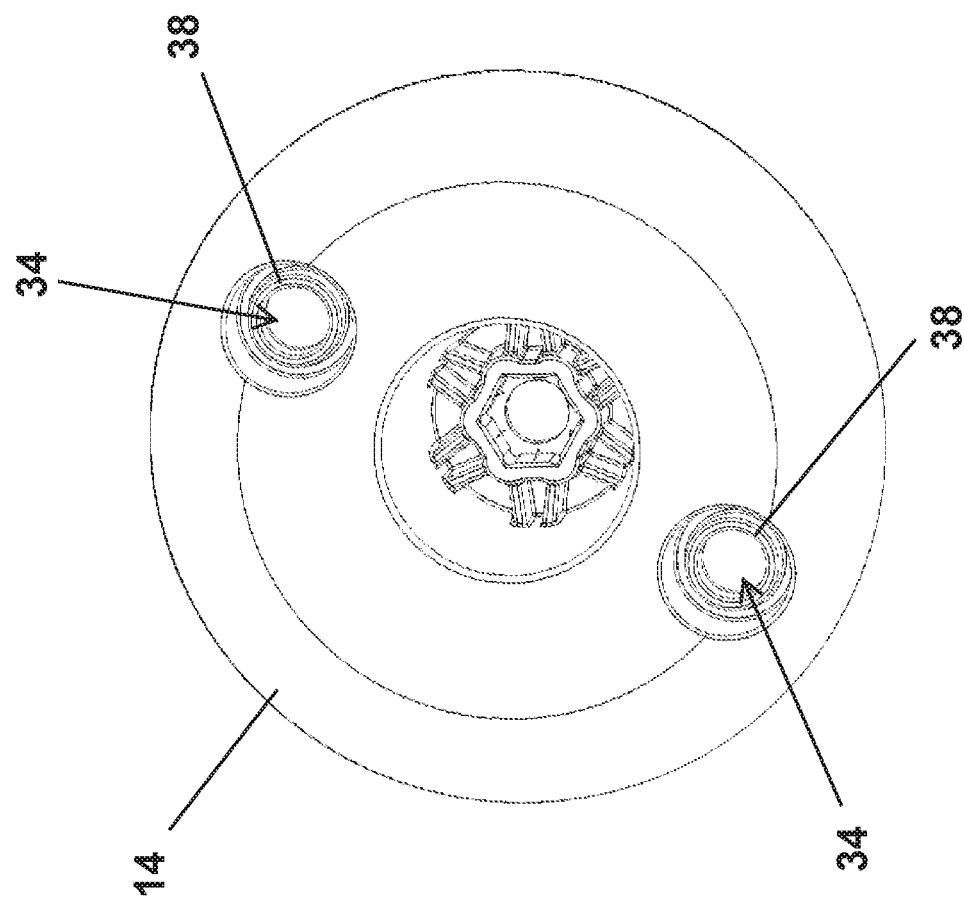
FIG. 11 is a bottom perspective view of the housing of the head of FIG. 2.
Figure 12:
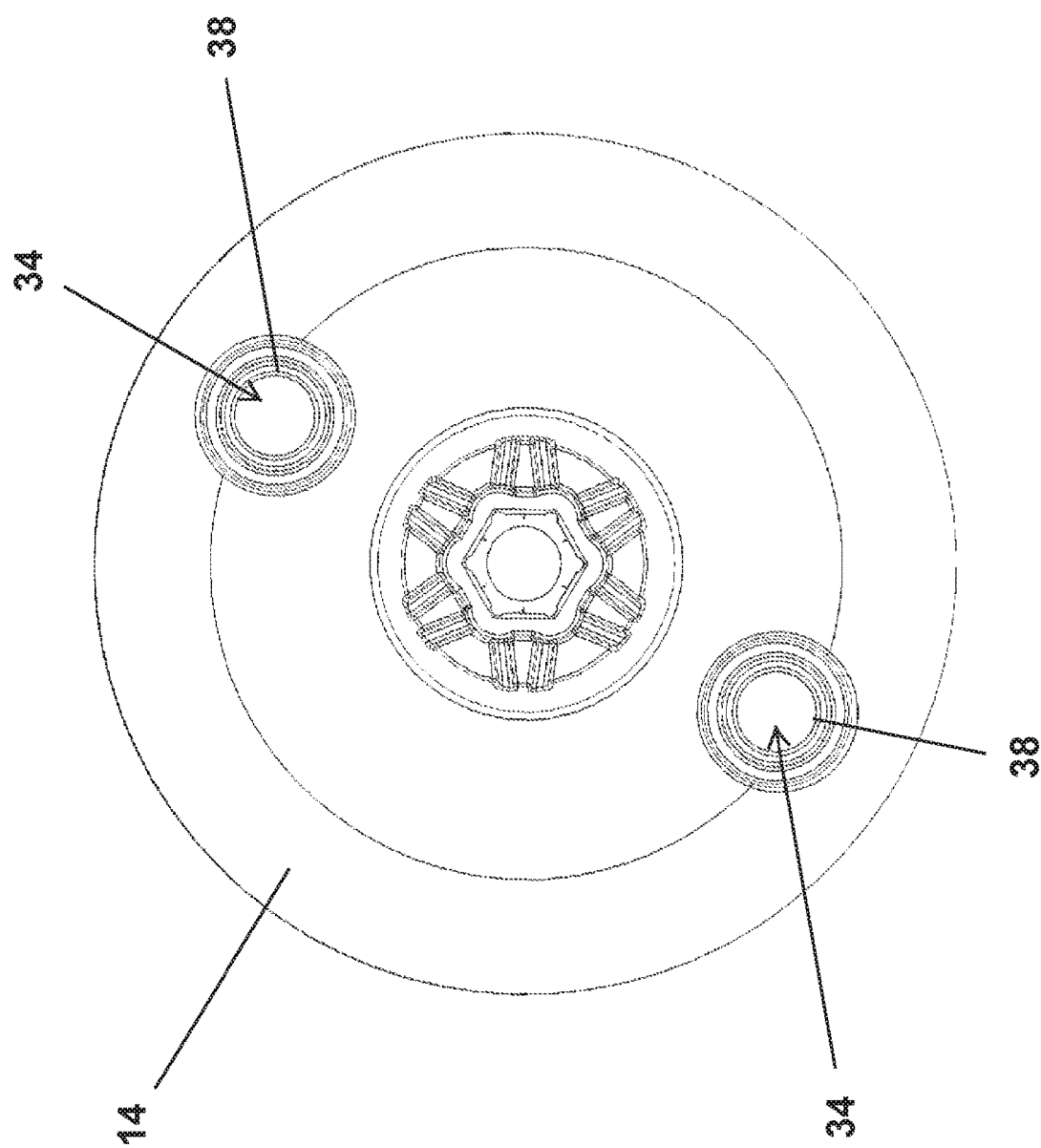
FIG. 12 is a bottom view of the housing shown in FIG. 11.
Figure 13:
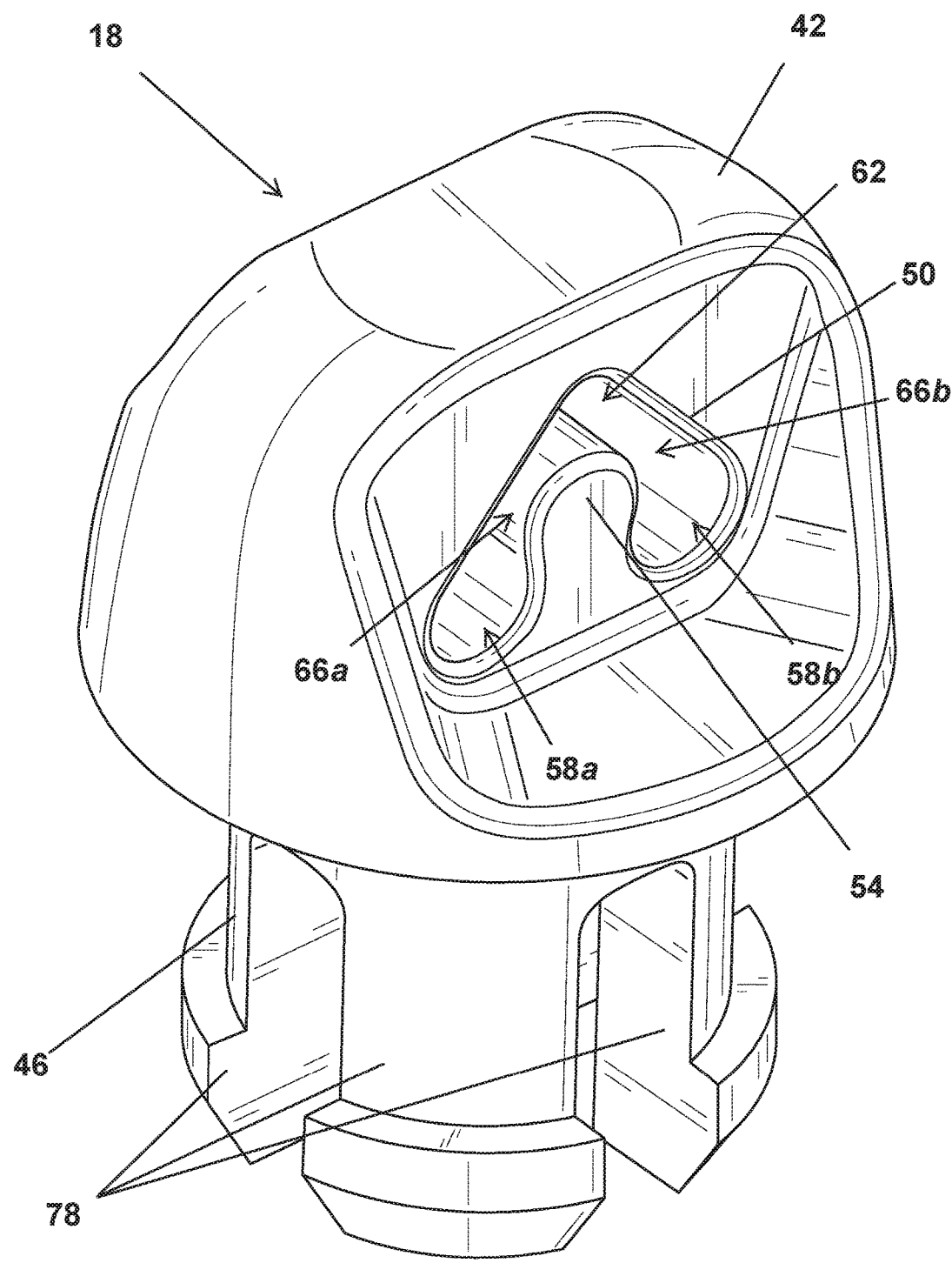
FIG. 13 is a top perspective view of a line holder of the head of FIG. 2.
Figure 14:
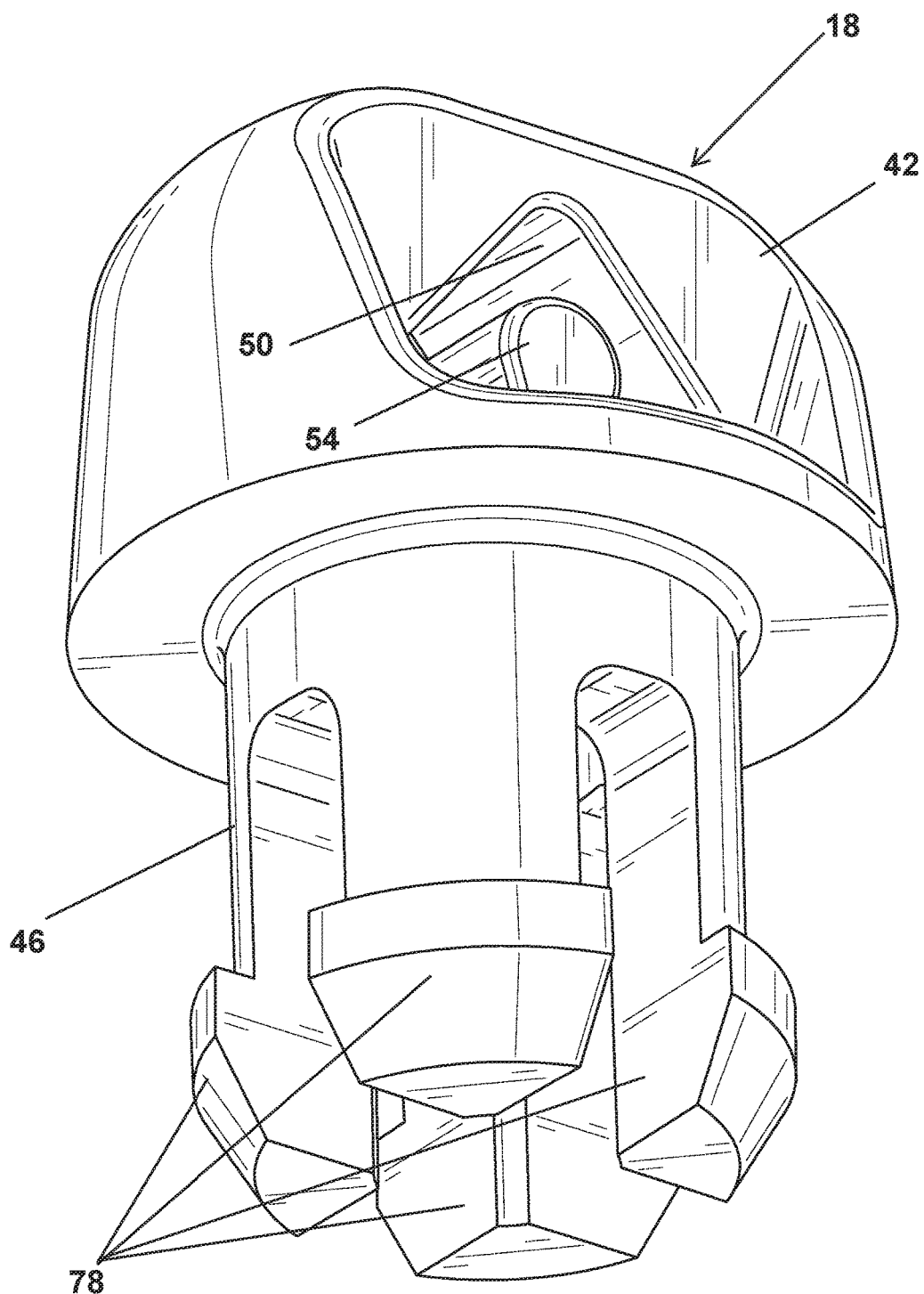
FIG. 14 is a bottom perspective view of the line holder of FIG. 13.
Figure 15:
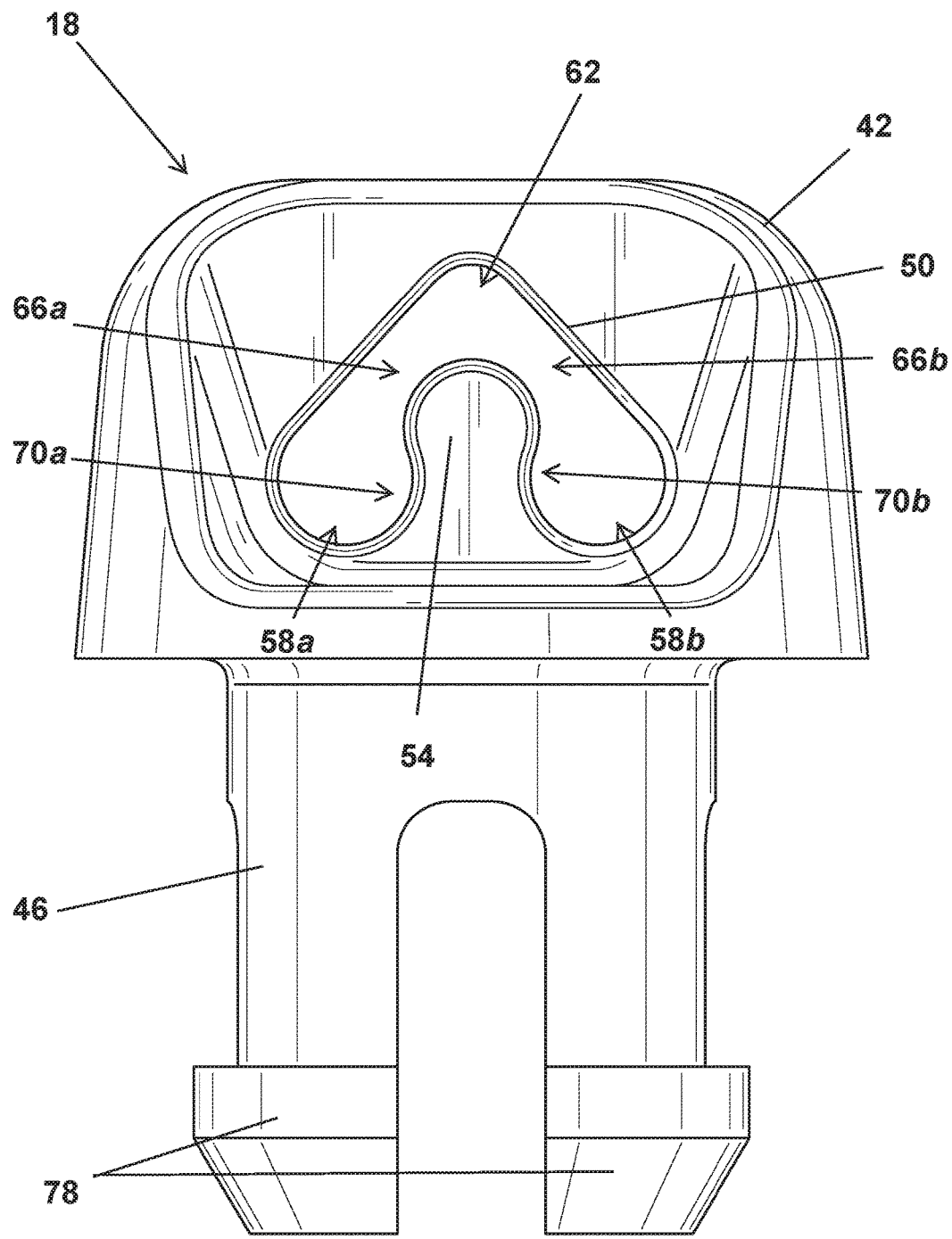
FIG. 15 is an end view of the line holder of FIG. 13.
Figure 16:
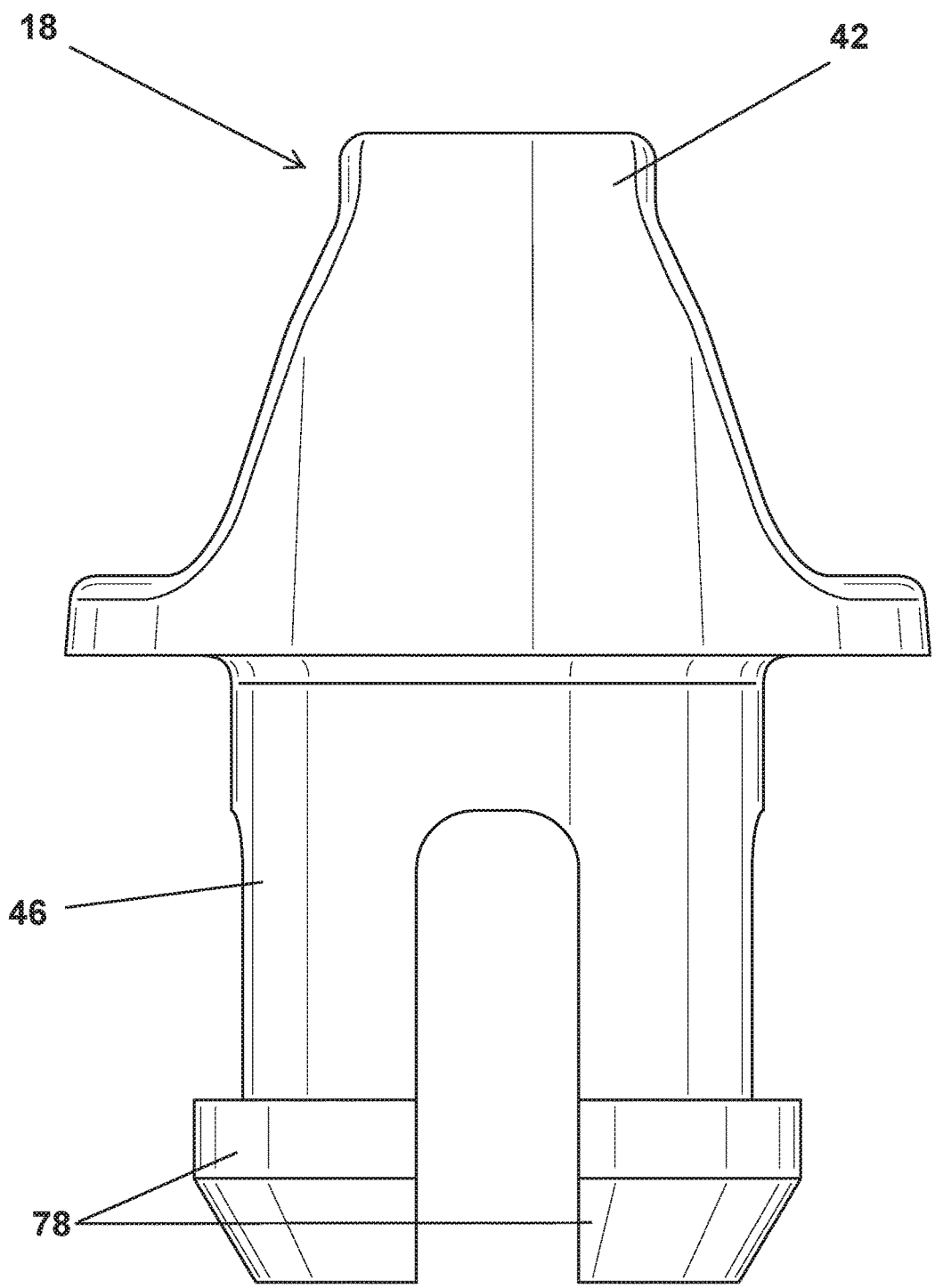
FIG. 16 is a side view of the line holder of FIG. 13.
Figure 17:
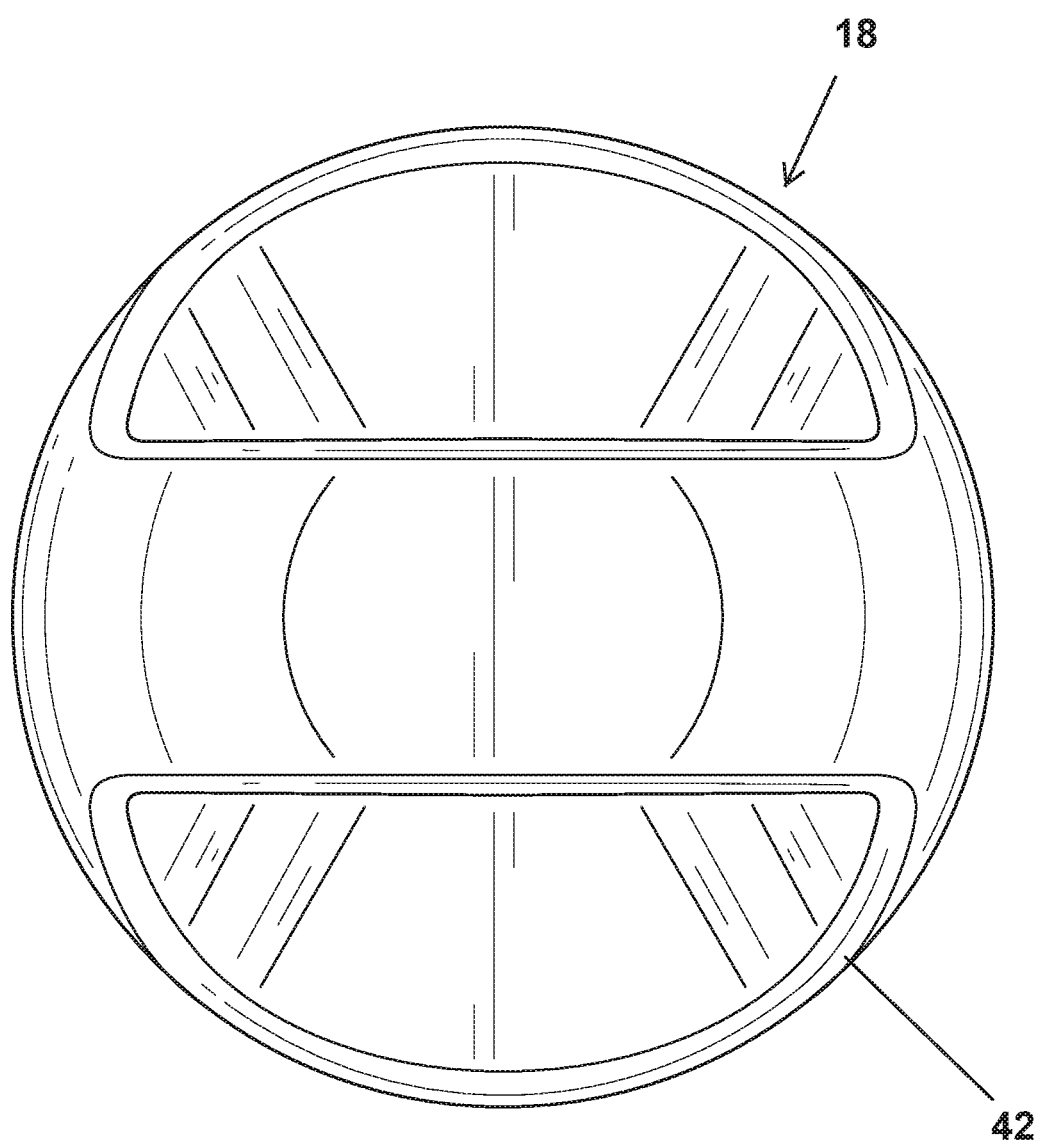
FIG. 17 is a top view of the line holder of FIG. 13.
Figure 18:
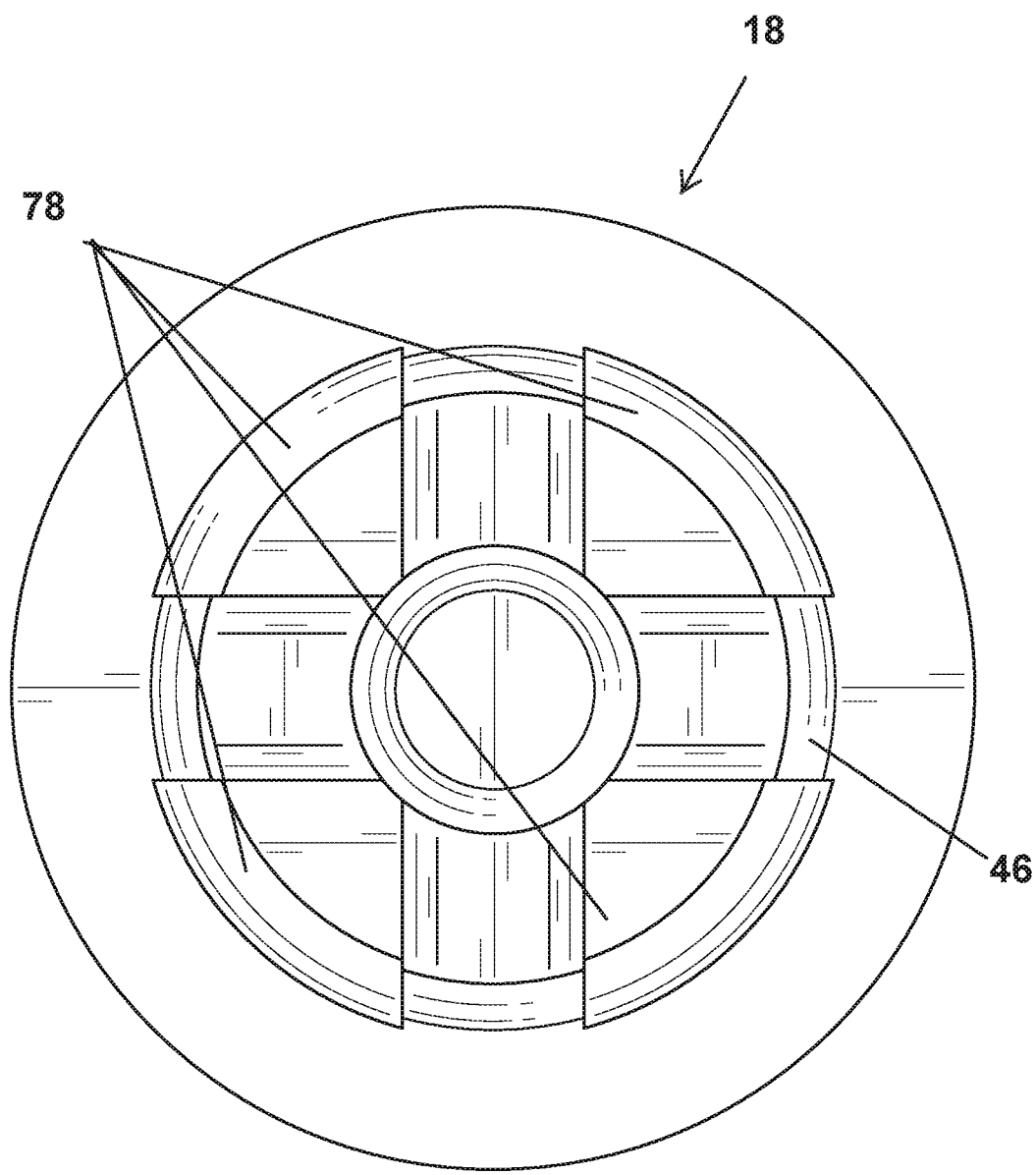
FIG. 18 is a bottom view of the line holder of FIG. 13.
Figure 19:
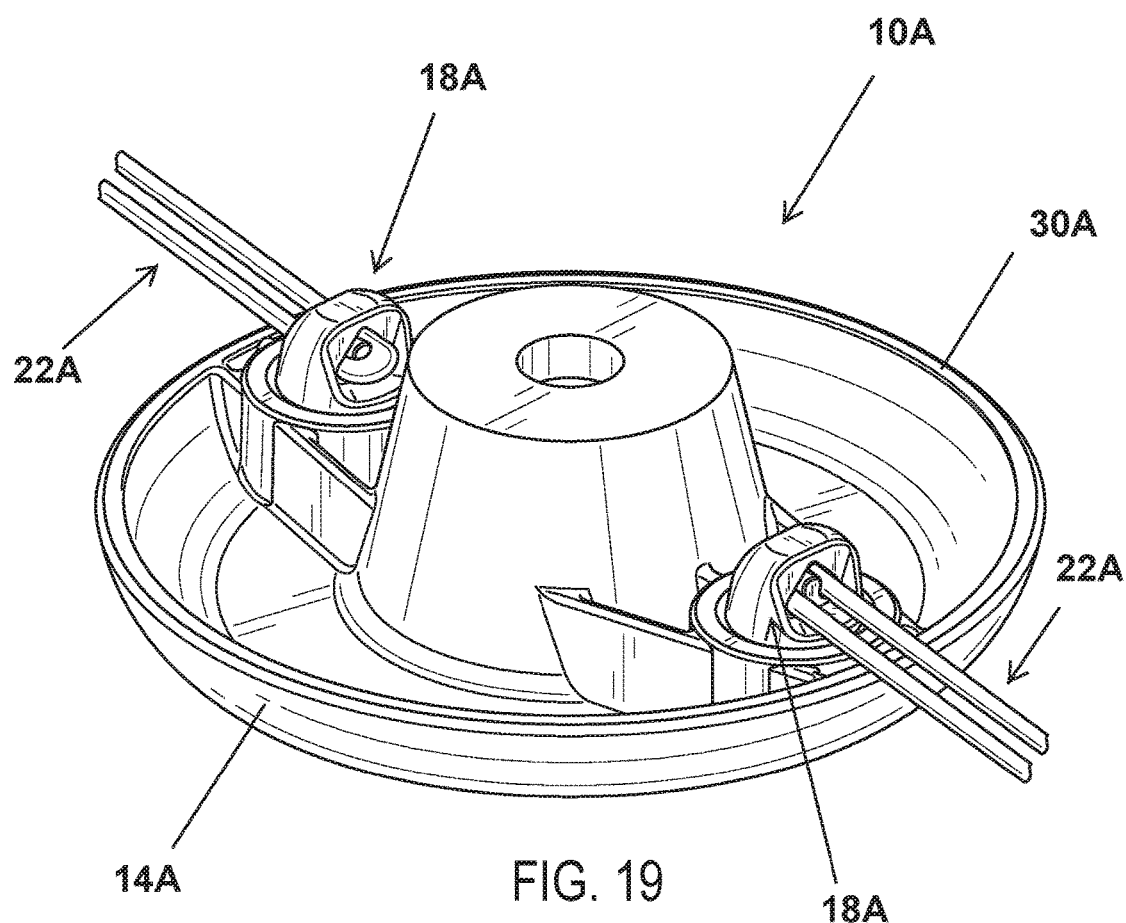
FIG. 19 is a top perspective view of an alternative construction of a trimmer head for use with a trimmer.
Figure 20:
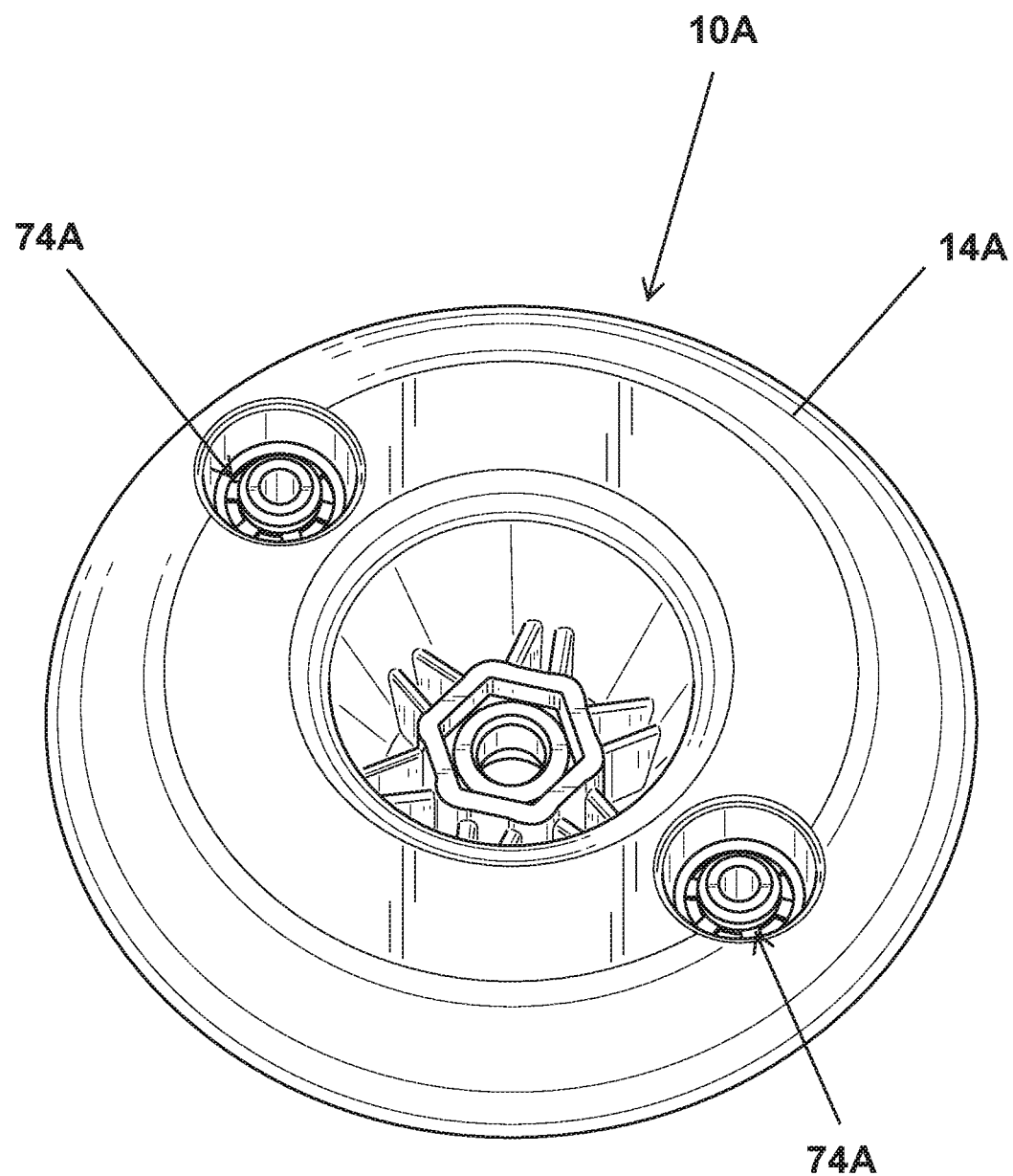
FIG. 20 is a bottom perspective view of the head of FIG. 19.
Figure 21:
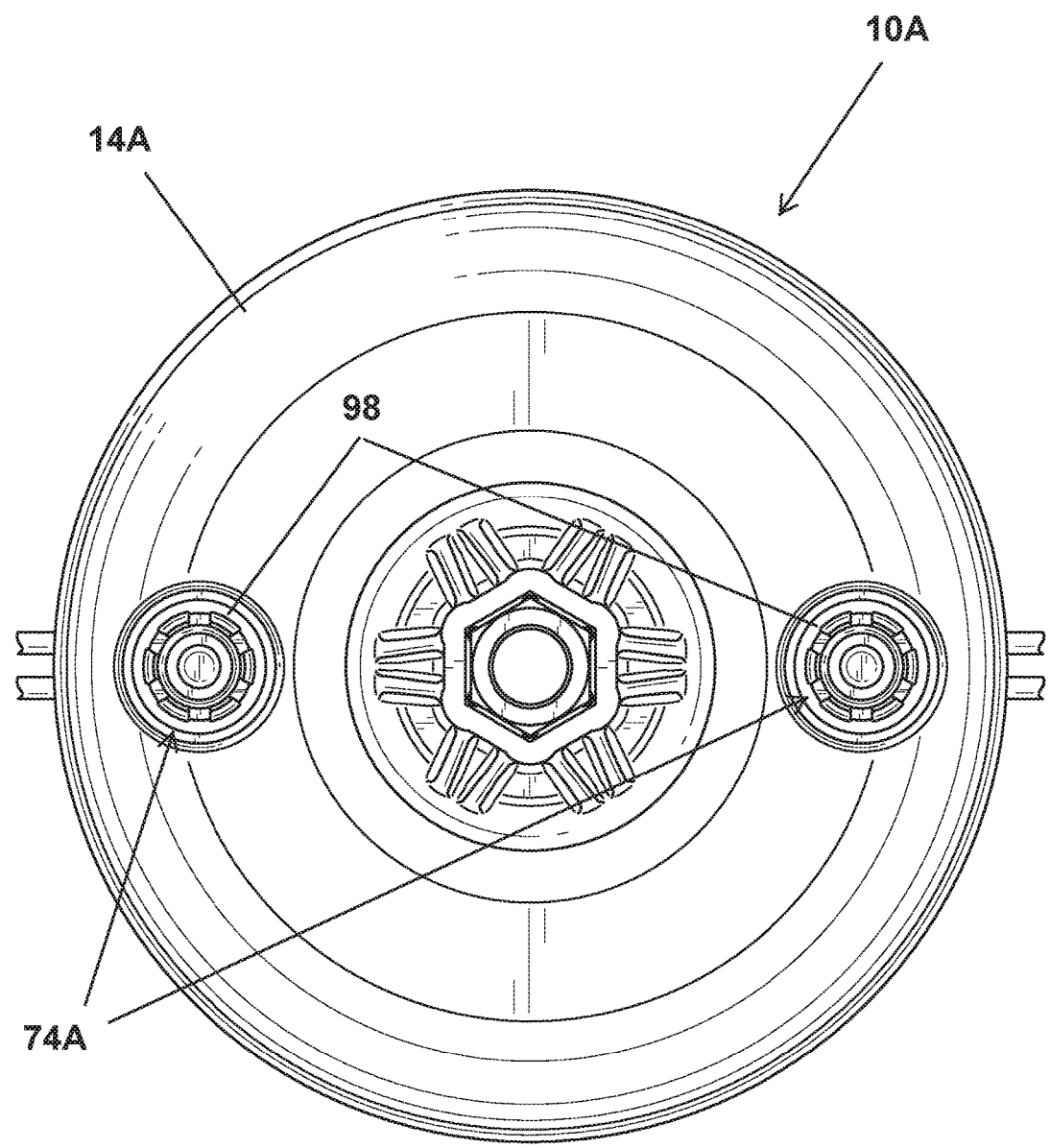
FIG. 21 is a bottom view of the head of FIG. 19.
Figure 22:
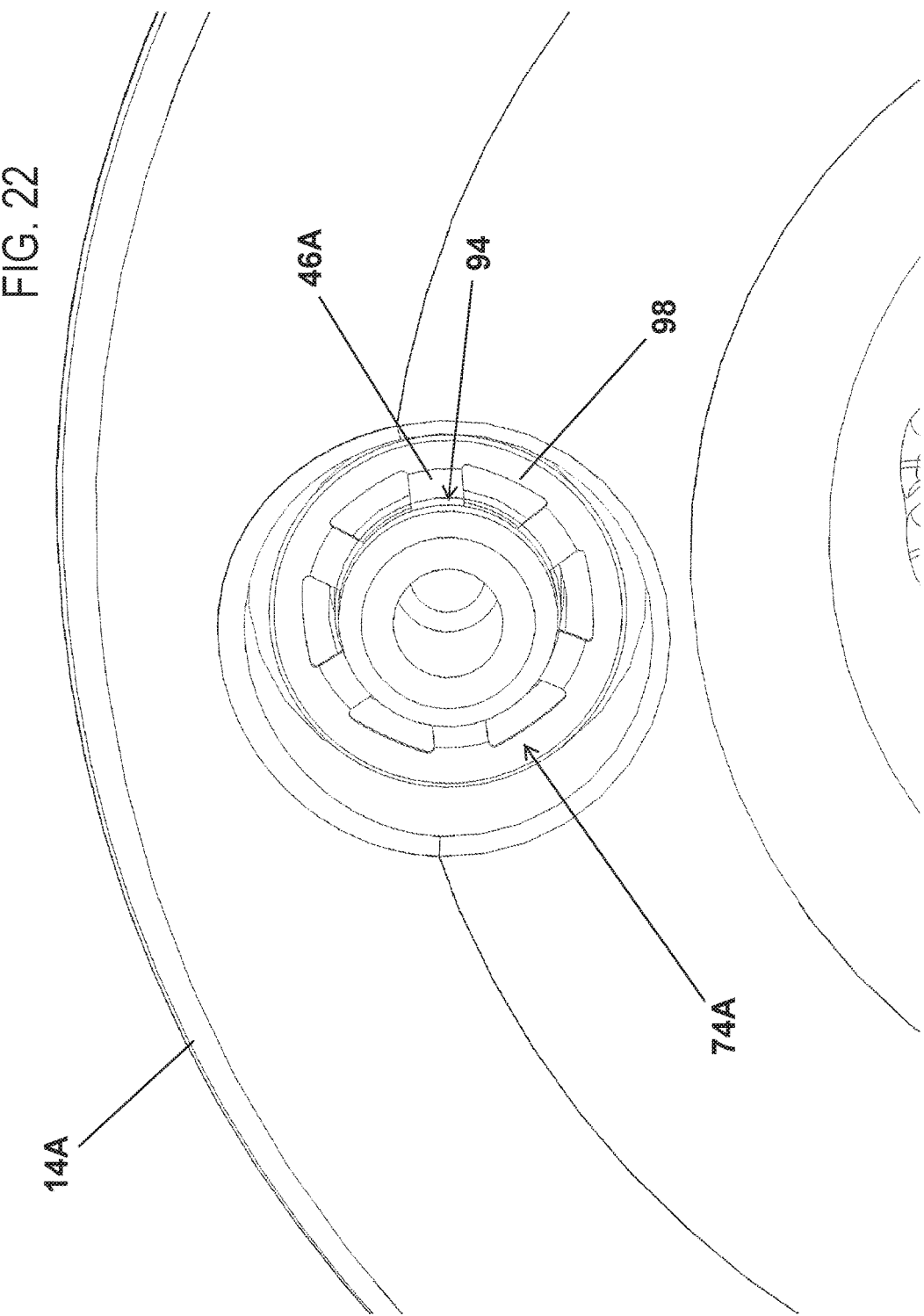
FIG. 22 is a bottom perspective view of an enlarged portion of the head of FIG. 19 illustrating a retainer for the line holder.
Figure 23:
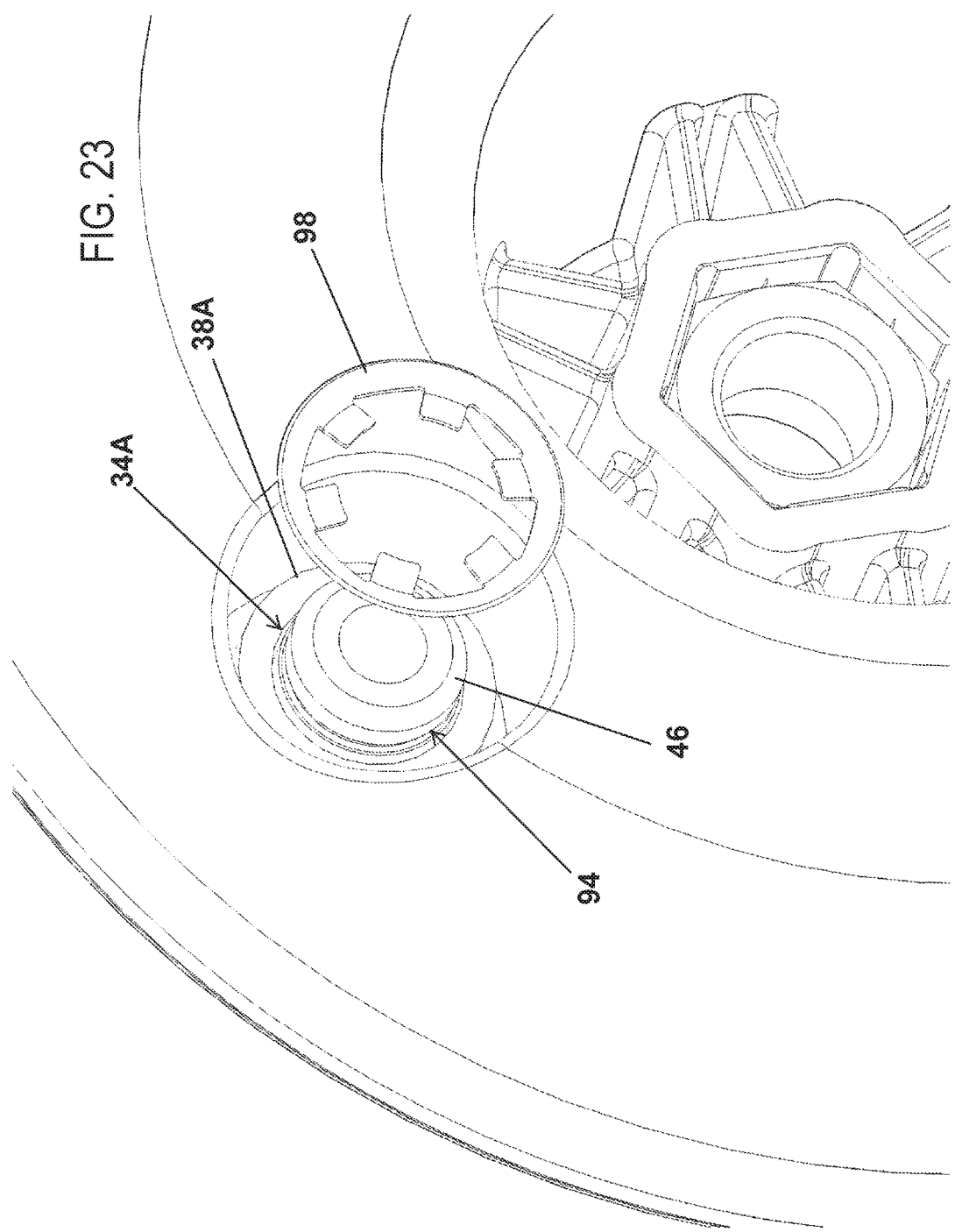
FIG. 23 is a bottom perspective view of an enlarged portion of the head of FIG. 19 illustrating operation of the retainer.
Figure 24:
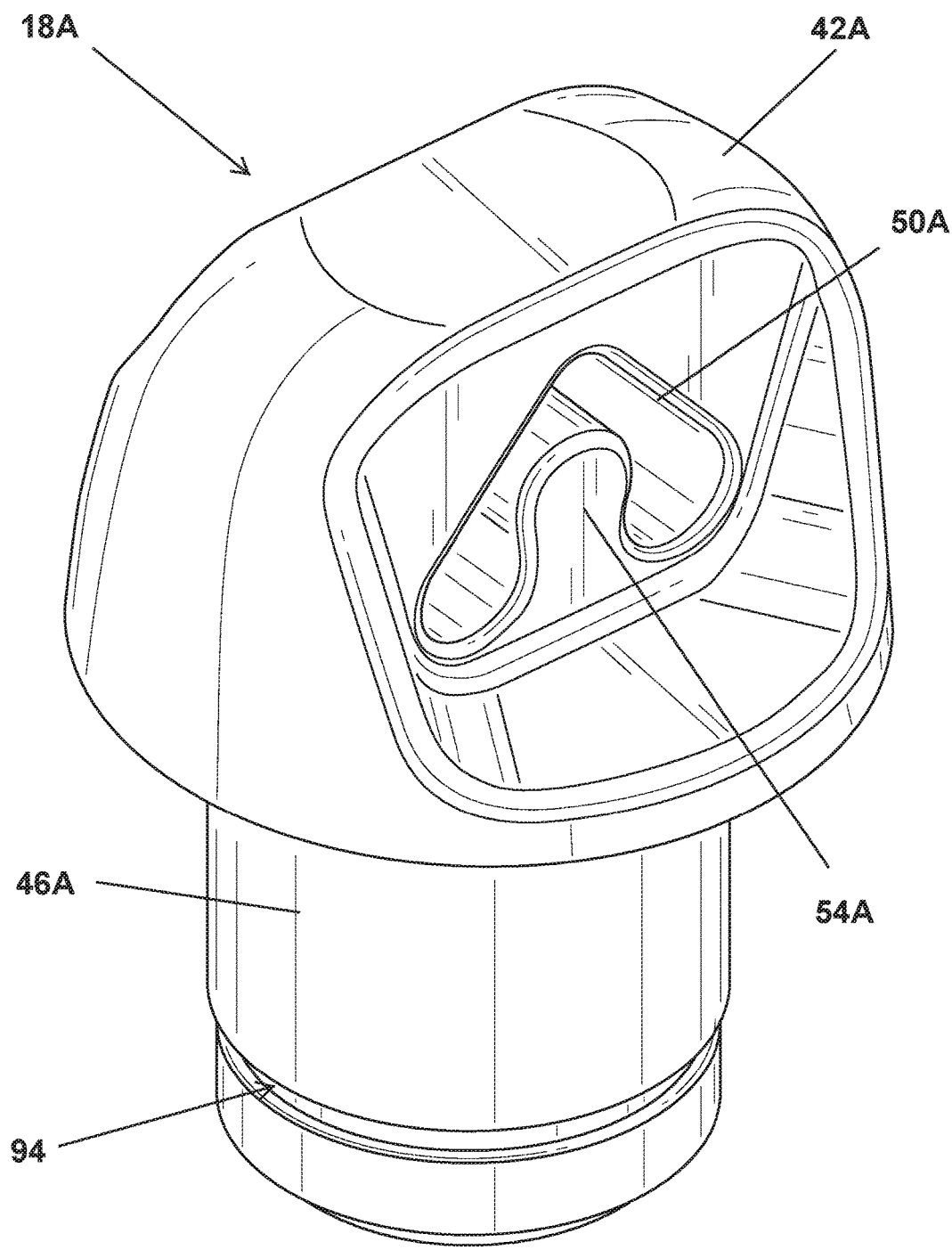
FIG. 24 is a top perspective view of a line holder for the head of FIG. 19.
Figure 25:
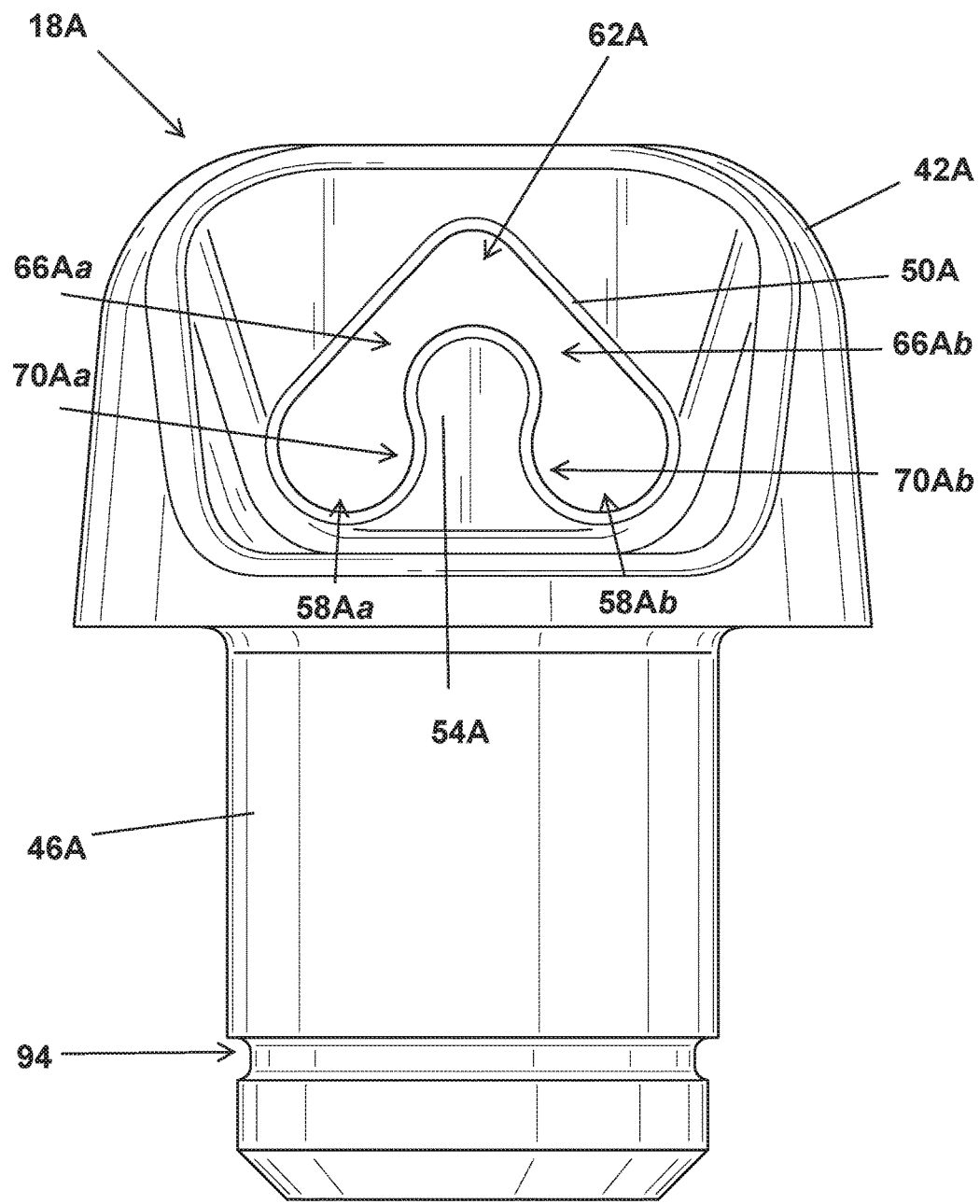
FIG. 25 is an end view of the line holder of FIG. 24.
Figure 26:
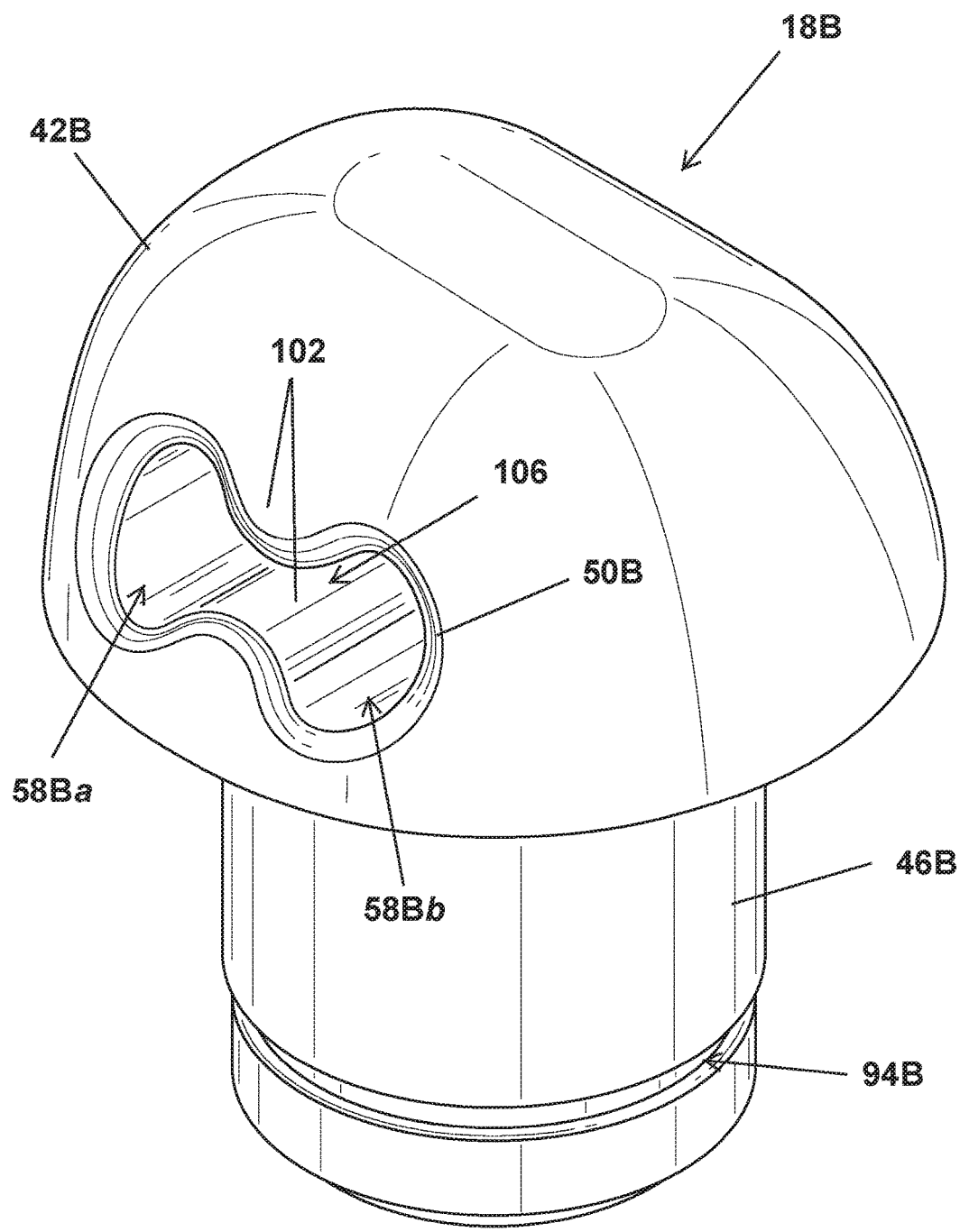
FIG. 26 is a top perspective view of an alternative construction of a line holder for a trimmer head.
Figure 27:
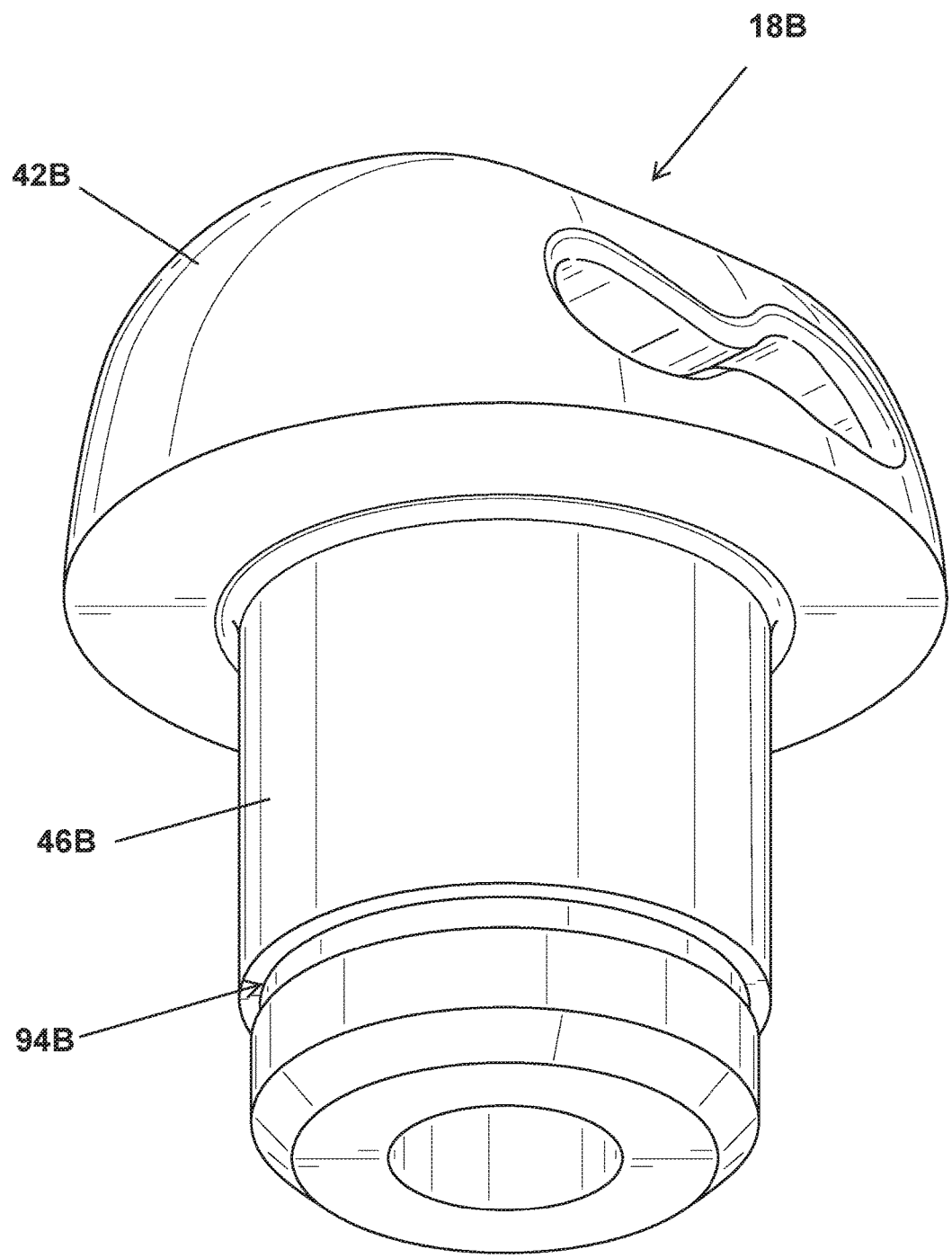
FIG. 27 is a bottom perspective view of the line holder of FIG. 26.

As shown in FIGS. 9-10, the post 46 is received in an associated opening 34. In the illustrated construction, the line holder 18 is supported for pivoting movement about a pivot axis P parallel to the axis A. The illustrated line holder 18 is fully pivotable about the axis P. Centrifugal force on the line 22 supported by the line holder 18 tends to pivot the line holder 18 so that the line 22 extends outwardly during operation.

A retainer 74 retains the line holder 18 on the housing 14. In the illustrated construction, the retainer 74 includes flexible fingers 78 biased radially outwardly to releasably engage the rim 38 (as shown in FIGS. 9-10) and flexing inwardly to allow the post 46 to move into and out of the opening 34. In other constructions, the retainer 74 may include different structure to releasably retain (see FIGS. 20-23, described below) or to permanently retain (not shown) the line holder 18 relative to the housing 14.

Each line 22 has (see FIG. 1) opposite ends 82a, 82b and (see FIGS. 6 and 7A) is folded at an intermediate portion 86 to provide line sections 90a, 90b. As illustrated, each line 22 has a round cross-section. It should be understood that, in other constructions (not shown), the line(s) 22 may have a different cross-sectional shape (e.g., square, flat, star, etc.). In addition, the outer surface of each line 22 is illustrated as smooth. In other constructions (not shown), the outer surface may be non-smooth (e.g., have teeth, serrations, etc.).

To support the line 22 in the associated line holder 18, the folded portion 86 may be inserted from outside of the housing 14 (from beyond the outer periphery 30) into the opening 62. Thereafter, the folded portion 86 is moved downwardly around the projection 54 and the line sections 90a, 90b move through the respective passages 66a, 66b into the respective receptacles 58a, 58b. To remove the line 22 from the line holder 22, the process may be reversed.

The passages 66a, 66b may be sized to allow movement of the line 22 between the opening 62 and the receptacles 58a, 58b. In such constructions, the passages 66a, 66b may inhibit movement from the receptacles 58a, 58b toward the opening 62 so that the line 22 is not disengaged during use.

When the passages 66a, 66b are sized/constructed to prevent movement of the portions of the line 22 between the opening 62 and the receptacles 58a, 58b, structure defining the passages 66a, 66b may be movable (e.g., flexible) relative to other structure to allow such movement. For example, the projection 54 may move (e.g., flex) to one side (toward the second receptacle 58b) to allow the first line section 90a to pass through the passage 66a and into the receptacle 58a and then to the other side (toward the first receptacle 58a) to allow the second line section 90b to pass. In a similar manner (additionally or alternatively), the wall 50 may move (e.g., flex) relative to the projection 54 to allow the line sections 90a, 90b to pass. The line 22 may also be compressible to pass through the narrowed passages 66a, 66b.

It should be understood that the line 22 may be installed/removed in a different manner. For example, the opposite ends 82a, 82b of the line 22 can be inserted from the rear face of the line holder 18, into and through the respective receptacles 58a, 58b until the folded portion 86 is positioned around the projection 54. Insertion of the line 22 can be done, when the trimmer head 10 is removed from the trimmer T, from inside the housing 18 in a direction from the axis A, rather than from outside. Alternatively, this can be done from outside the housing 18, and, after insertion of the line 22, the line holder 18 can be pivoted so that the line sections 90a, 90b extend outwardly.

As another example, one end 82a or 82b can be inserted into the opposite receptacle 58b or 58a, routed around the projection 54 and through the associated receptacle 58a or 58b until the folded portion 86 is positioned around the projection 54. If installation is done with the trimmer head 10 connected to the trimmer T, during installation, the line holder 18 can be pivoted to allow access to the end 82*a* or 82*b* being threaded and to facilitate installation.

In operation of the trimmer head 10, a user may insert the line 22 into the corresponding line holder 18 from outside of the housing 14 (from beyond the outer periphery 30). Accordingly, installation of the folded line 22 does not require the trimmer head 10 to be disengaged from the trimmer T for access to the interior of the line holder 18. With the line(s) 22 installed, the user may then operate the trimmer T to cut vegetation. When necessary (e.g., when a line 22 is worn, damaged, etc.), the user may remove the line 22 as discussed above and install a replacement line 22.

If a line 22 contacts an obstruction while cutting, the line holder 18 can pivot to, for example, prevent damage to the trimmer head 10, the line holder 18, the line 22, etc. In addition, the line 22 may move relative to the line holder 18 when contacting an obstruction. In such cases, the leading line section (e.g., the line section 90*a*) will be pushed into the associated undercut (e.g., the undercut 70*a*). Meanwhile, the trailing line section (e.g., the line section 90*b*) will be pushed against the wall 50 and away from the associated passage (e.g., the passage 66*b*). Such movement of the line sections 90*a*, 90*b* may inhibit the line 22 from disengaging the line holder 18.

FIGS. 19-25 illustrate an alternative construction of a trimmer head 10A and a line holder 18A for use with a powered trimmer, such as the trimmer T. Common elements have the same reference number "A". The description of the common elements, components and features is similar to the corresponding above description, except as contradicted below.

In the illustrated alternative construction, the structure of the line holder 18A for retaining a line 22A is the same as described above for the line holder 18. The line 22A is installed and removed as described above for the line 22 and the line holder 18.

As shown in FIGS. 20-25, a different retainer 74A is provided to retain the line holder 18A on the housing 14A. As illustrated, the retainer 74A includes a groove 94 defined in the post 46A and a retaining ring 98 selectively engageable in the groove 94 and against the rim 38A of the housing 14A. After the post 46A is inserted into the opening 34A, the ring 98 is engaged in the groove 90 to retain the line holder 18A. The ring 98 is disengaged from the groove 94 to remove the line holder 18A.

FIGS. 19-25 illustrate another alternative construction of a line holder 18B. The line holder 18B may be used with the housing 14 or 14A and the line 22 or 22A, as described above, and with a powered trimmer, such as the trimmer T. Common elements have the same reference number "B". The description of the common elements, components and features is similar to the corresponding above description, except as contradicted below.

Figure 28:
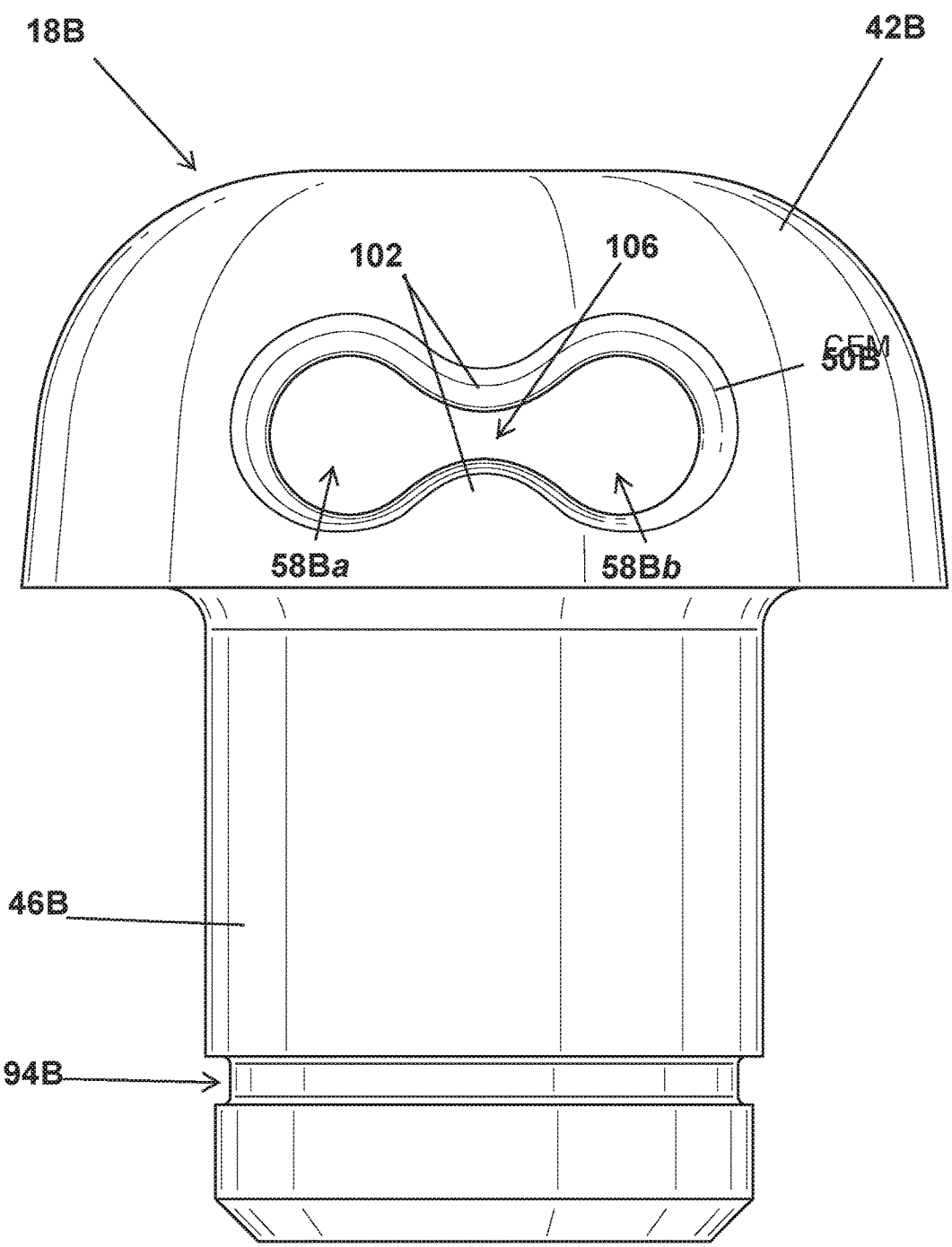
FIG. 28 is an end view of the line holder of FIG. 26.
Figure 29:
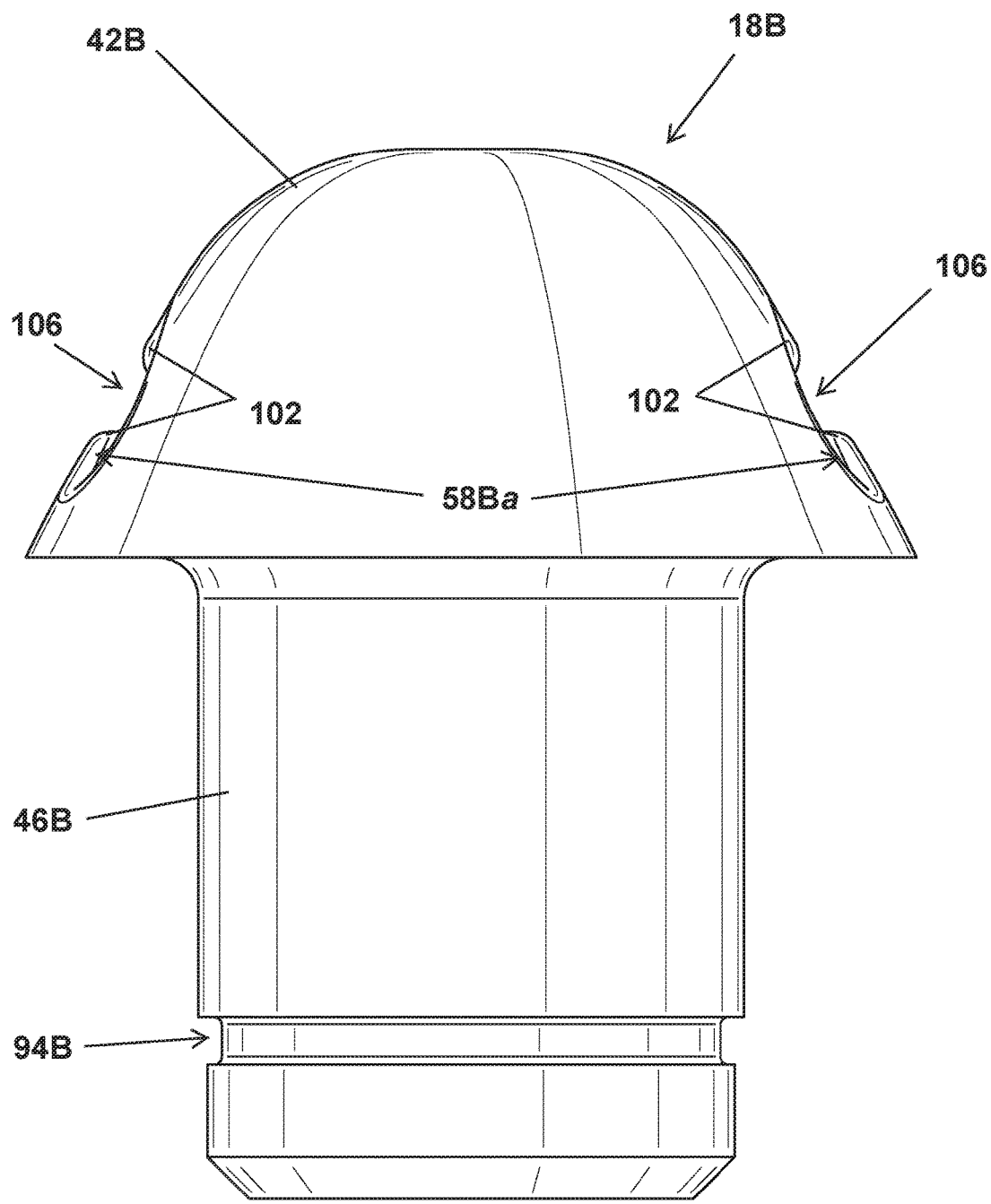
FIG. 29 is a side view of the line holder of FIG. 26.
Figure 30:
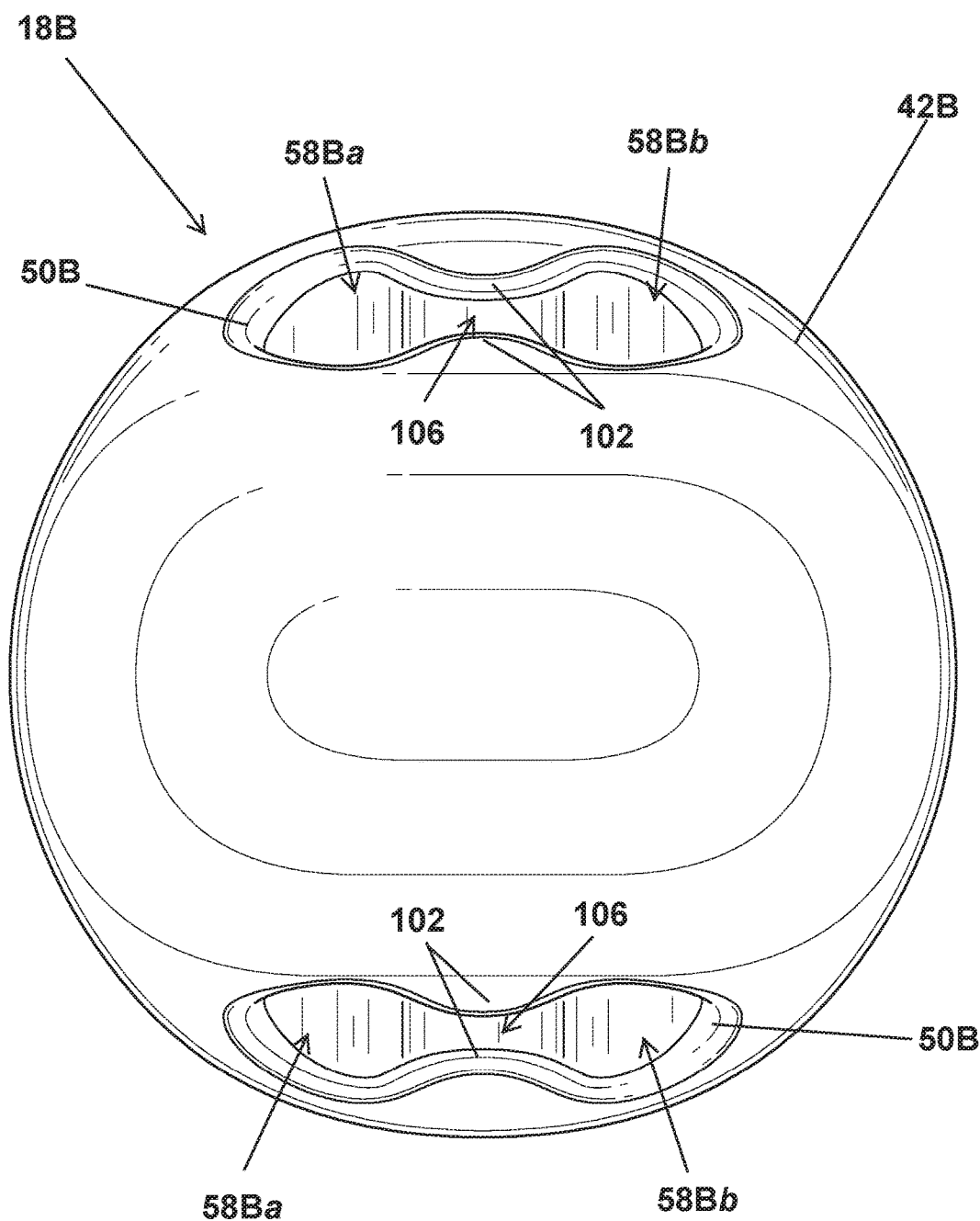
FIG. 30 is a top view of the line holder of FIG. 26.
Figure 31:
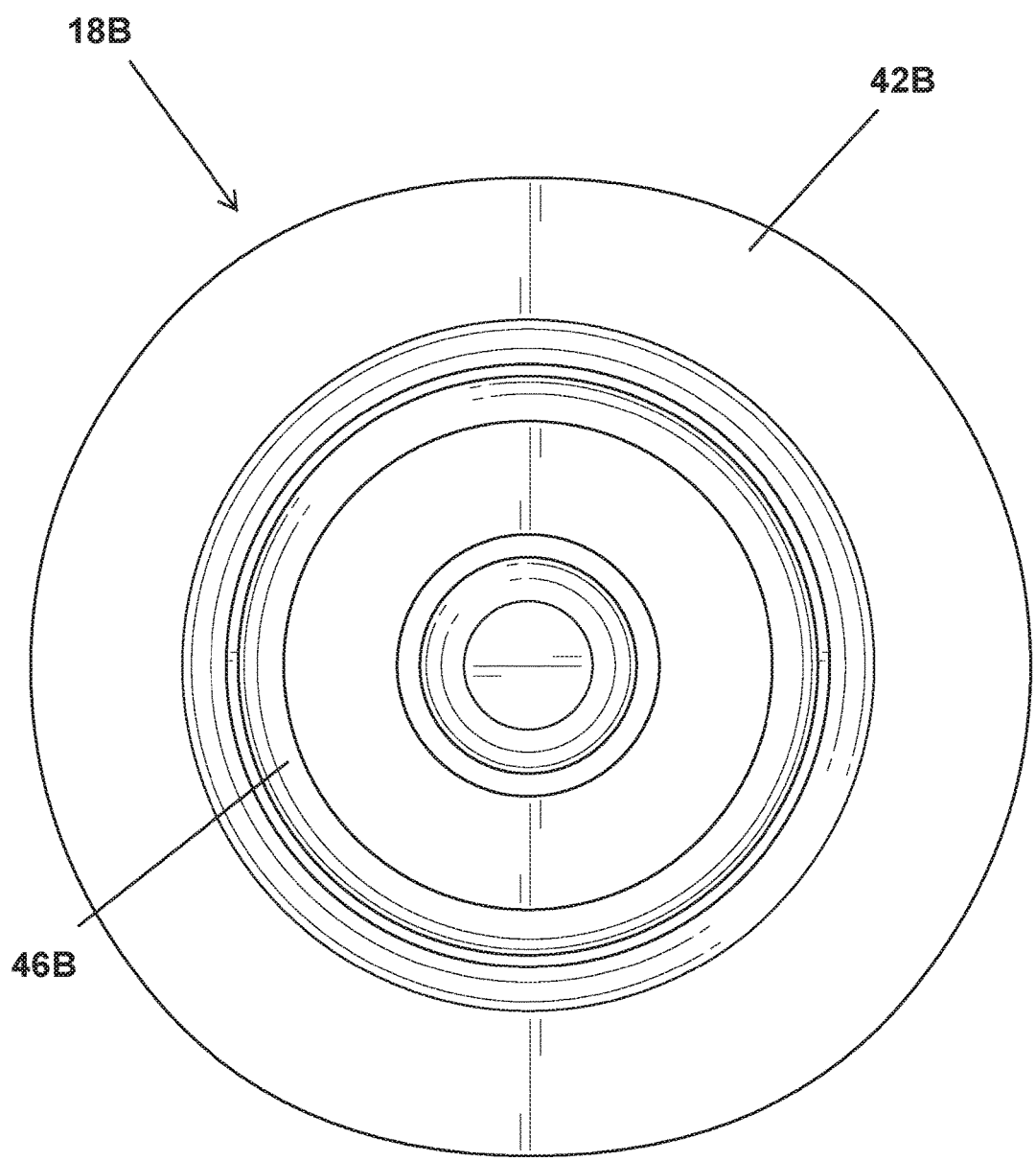
FIG. 31 is a bottom view of the line holder of FIG. 26.
Figure 32:
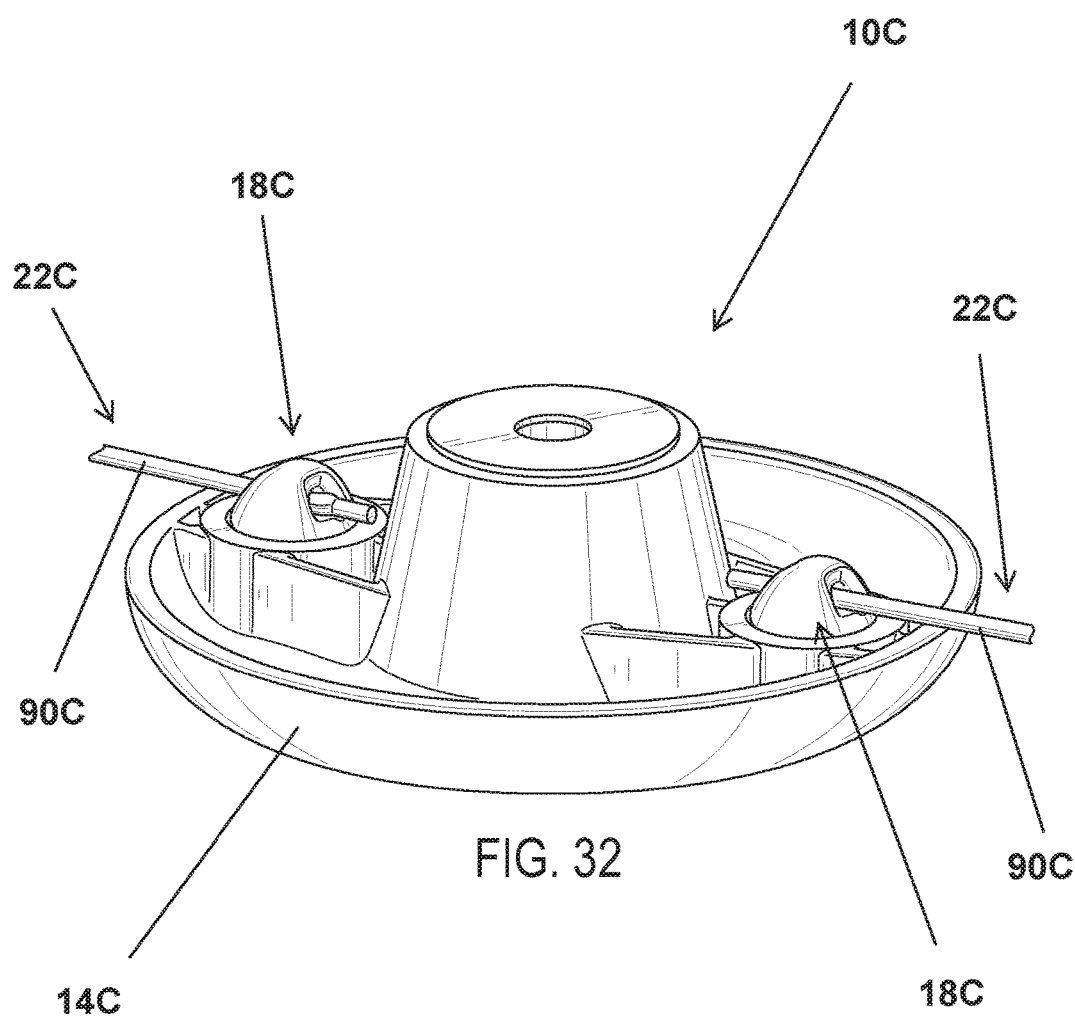
FIG. 32 is a top perspective view of another alternative construction of a trimmer head for use with a trimmer.
Figure 33:
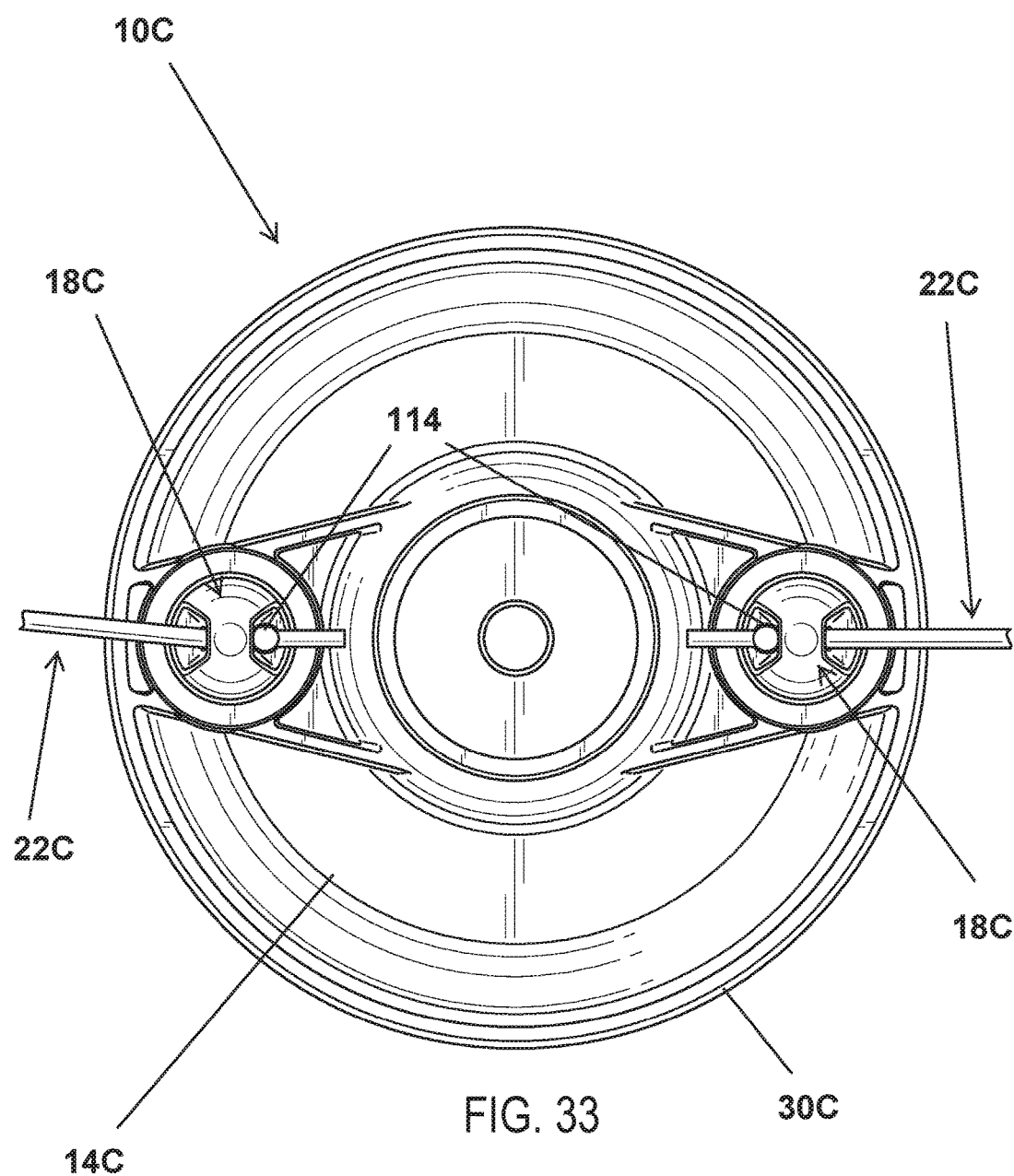
FIG. 33 is a top view of the head of FIG. 32.

As shown in FIG. 28, the line holder 18B includes a wall 50B defining the receptacles 58B*a*, 58B*b*. Protrusions 102 define a narrowed opening 106 between the receptacles 58B*a*, 58B*b*. In the illustrated construction, the narrowed opening 106 is sized to inhibit passage of the line therethrough.

In the illustrated construction, a folded line (not shown but similar to the line 22 or 22A) is inserted into the rear face of the line holder 18B (e.g., from inside the housing (not shown) in a direction from the axis, rather than from outside (as with the line holders 18, 18A)). The opposite ends of the line are inserted into and through the respective receptacles 58B*a*, 58B*b* until the folded portion is positioned around the protrusions 102. Alternatively, one end of the line can be inserted into the opposite receptacle 58B*b* or 58B*a*, routed around the protrusions 102 and through the associated receptacle 58B*a* or 58B*b* until the folded portion is positioned around the protrusions 102.

In other constructions, structure defining narrowed opening 106 may be movable (e.g., flexible) relative to other structure to allow such insertion but to inhibit removal during operation of the trimmer T. For example, the protrusion(s) 102 may move (e.g., flex) relative to one another to allow the folded portion of the line to pass through the opening 106.

The illustrated line holder 18B is operable with the retainer 74A described above and shown in FIGS. 20-23. However, in other constructions (not shown), the line holder 18B may be constructed with the retainer 74 shown in FIGS. 9-10.

FIGS. 32-39 illustrate another alternative construction of a trimmer head 10C and a line holder 18C for use with a powered trimmer, such as the trimmer T. Common elements have the same reference number "C". The description of the common elements, components and features is similar to the corresponding above description, except as contradicted below.

Figure 34:
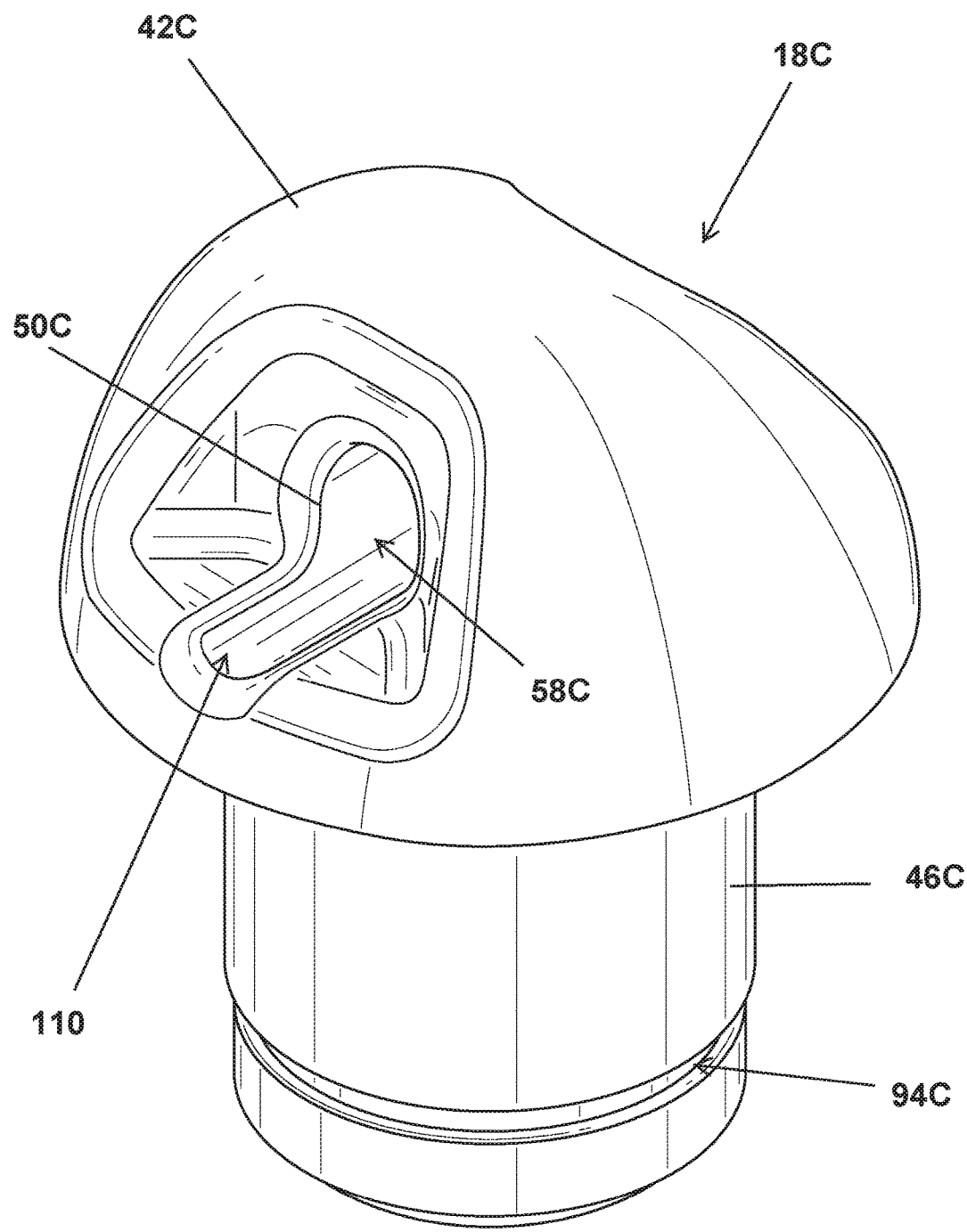
FIG. 34 is a top perspective view of a line holder for the head of FIG. 32.
Figure 35:
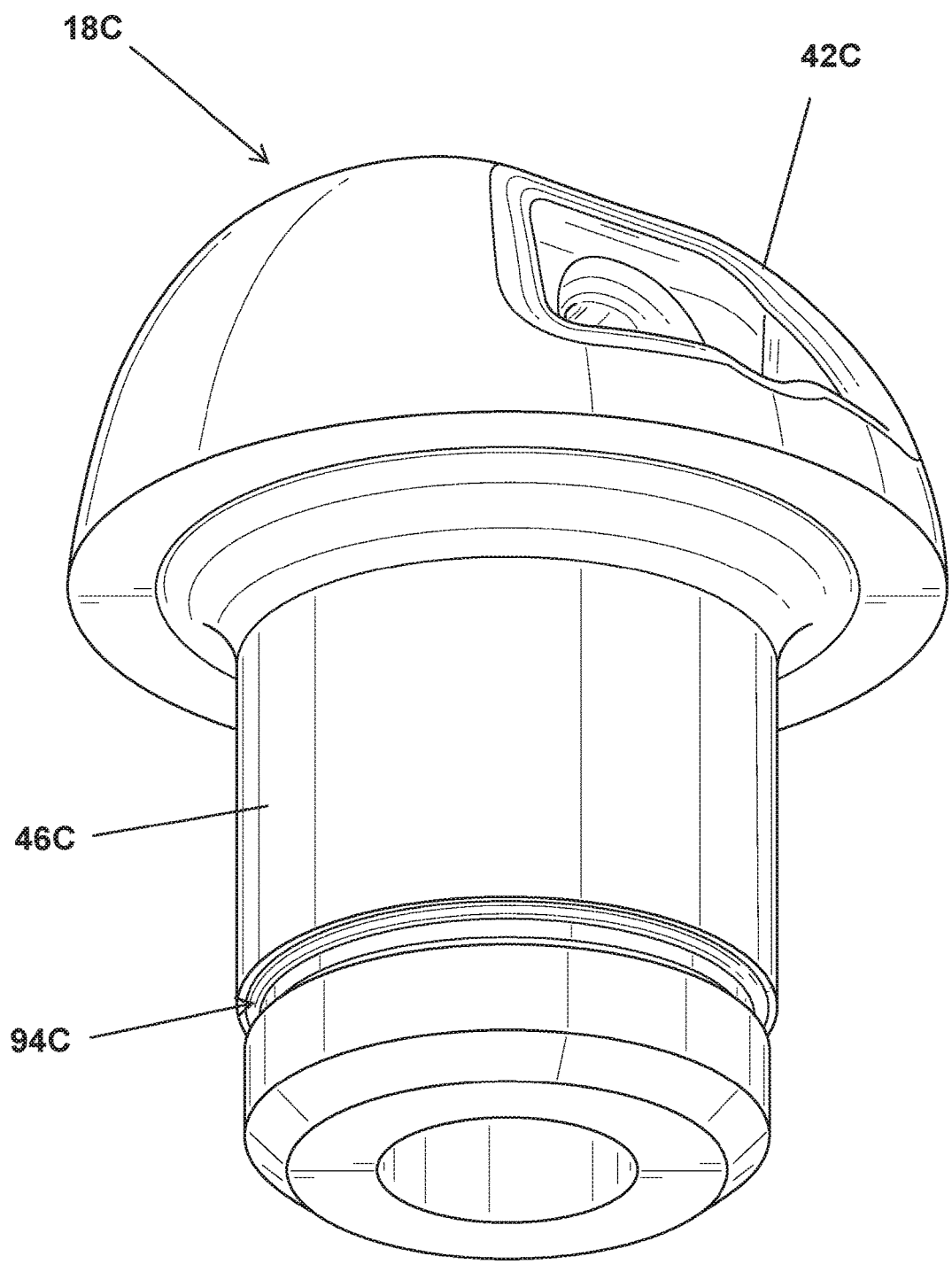
FIG. 35 is a bottom perspective view of the line holder of FIG. 34.
Figure 36:
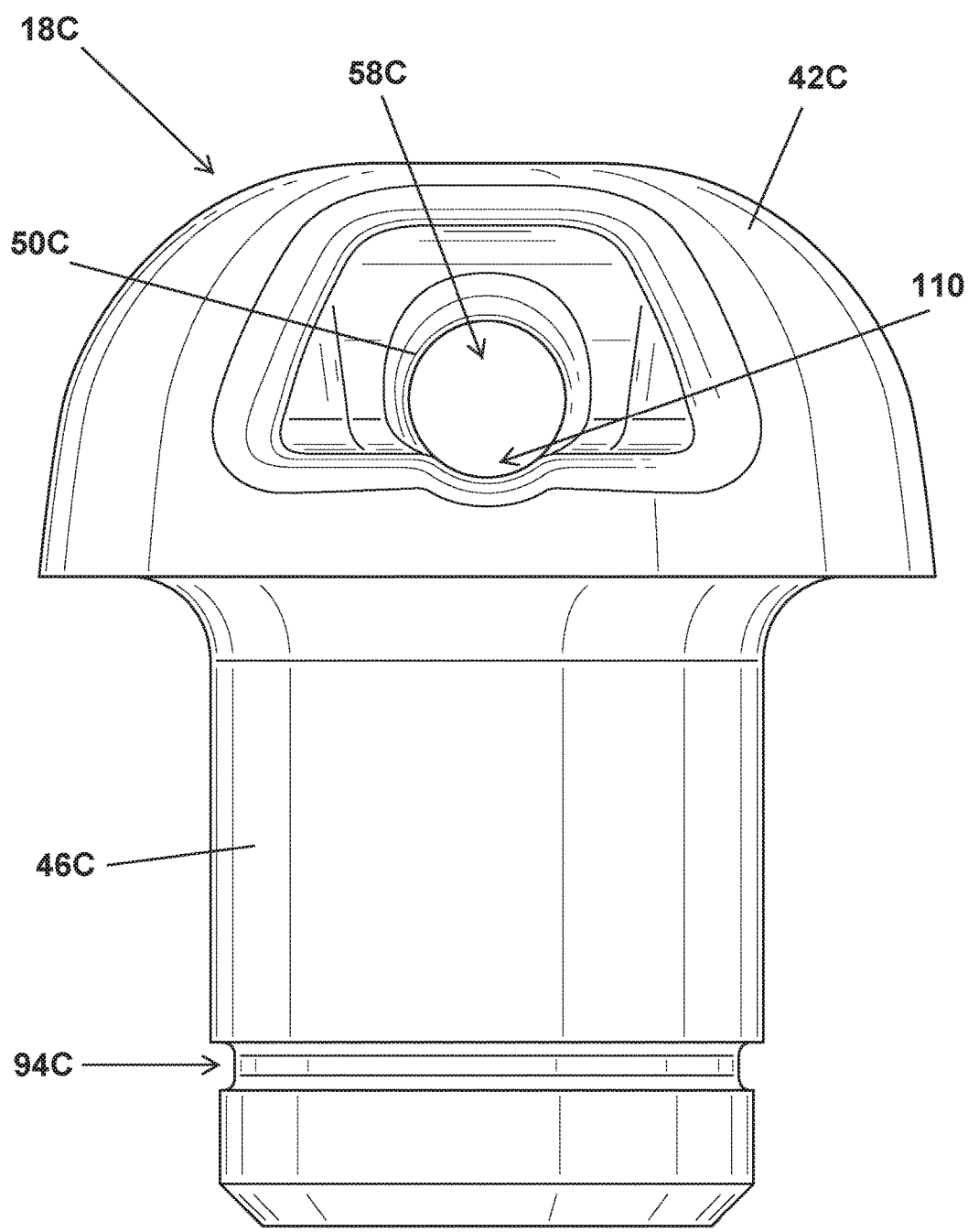
FIG. 36 is an end view of the line holder of FIG. 34.
Figure 37:
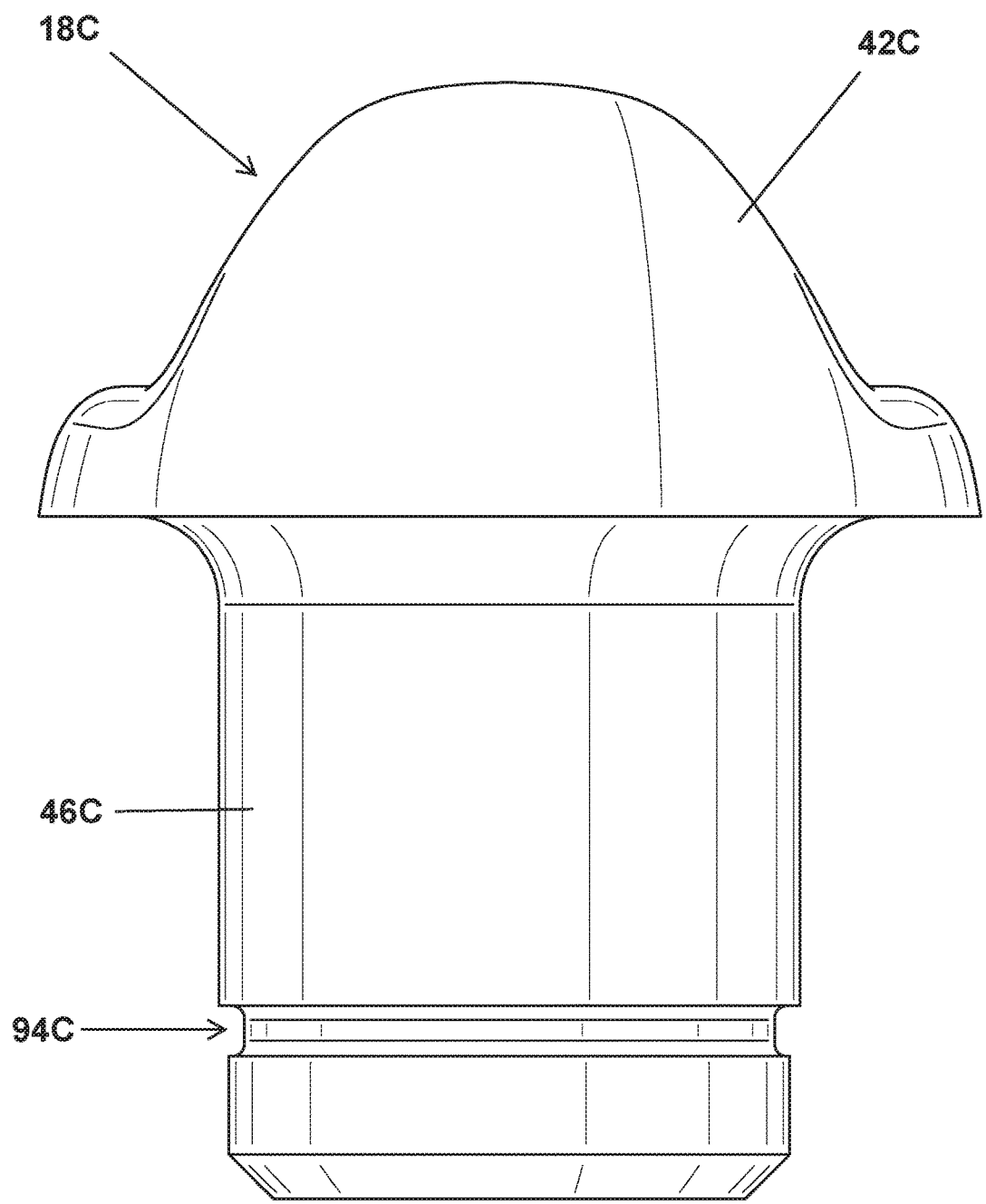
FIG. 37 is a side view of the line holder of FIG. 34.
Figure 38:
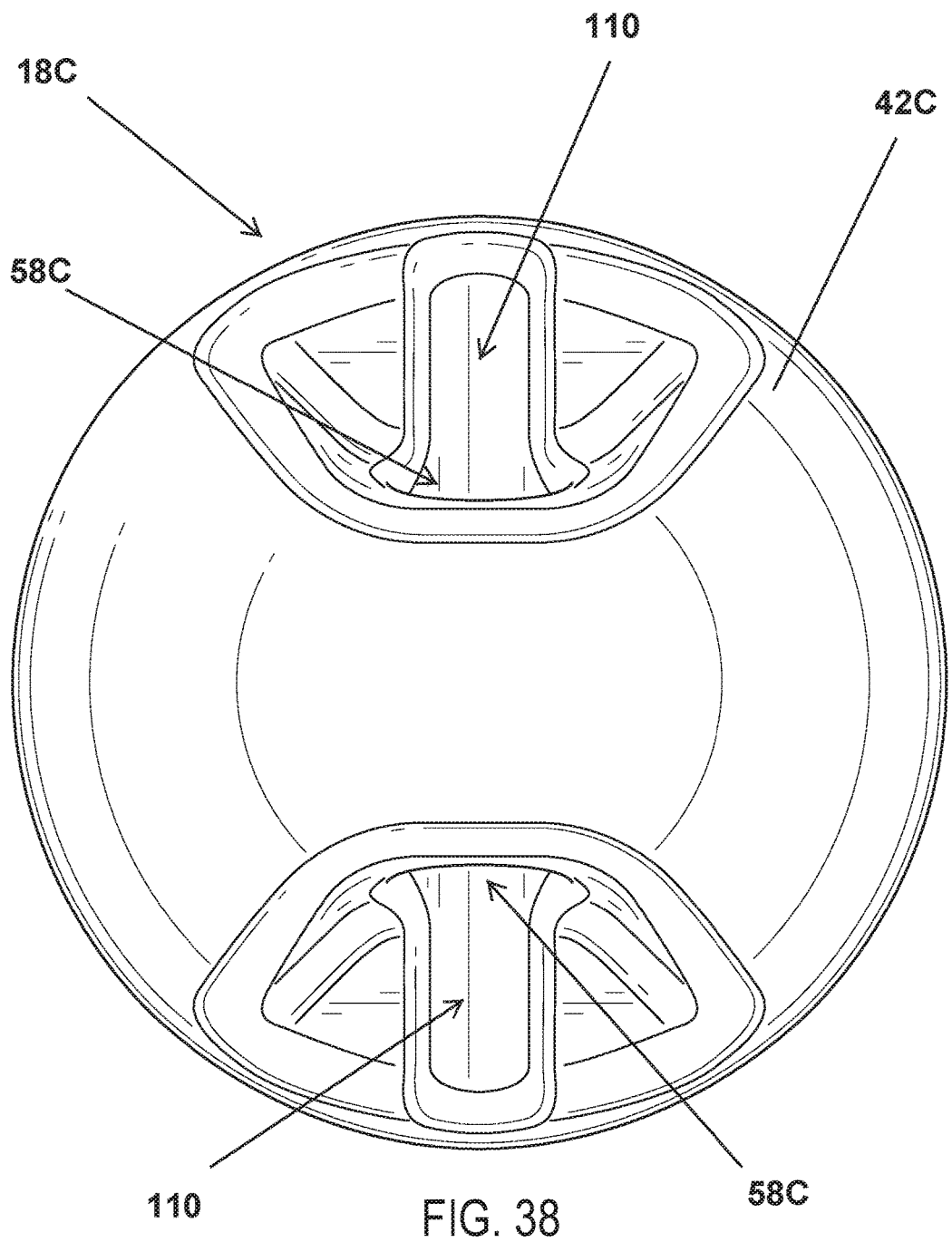
FIG. 38 is a top view of the line holder of FIG. 34.
Figure 39:
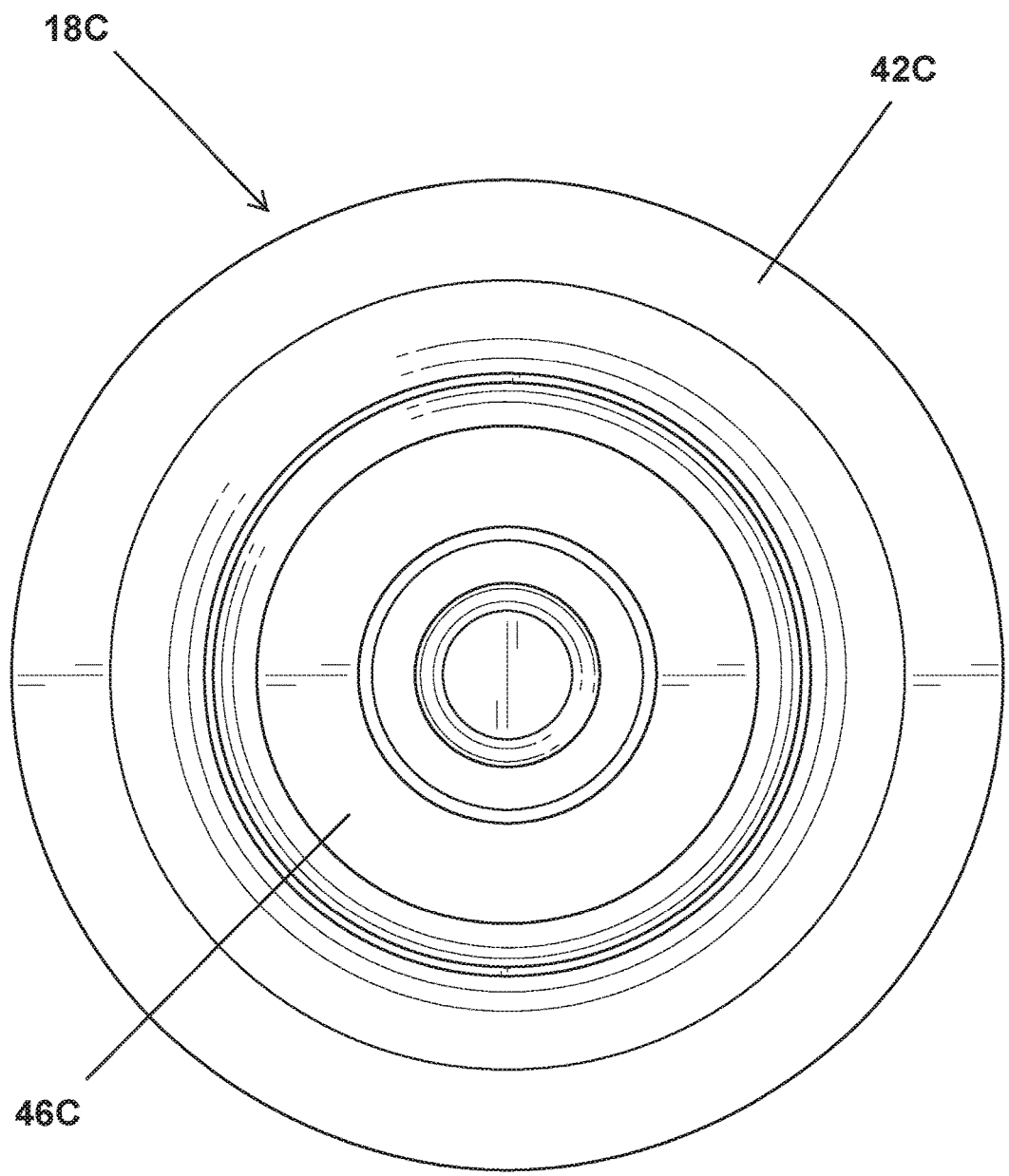
FIG. 39 is a bottom view of the line holder of FIG. 34.

In the illustrated construction (see FIGS. 32-33), the line holder 10C is used with a straight line 22C providing a single cutting line section 90C. As shown in FIGS. 34 and 36, the line holder 18C includes a wall 50C defining a receptacle 58C for the line 22C. A groove 110 is defined in the lower wall portion between the inner and outer faces of the line holder 18C.

In the illustrated construction, the line 22C is inserted into the receptacle 58C from the rear face of the line holder 18C (e.g., from inside the housing 14C in a direction from the axis A, rather than from outside (as with the line holders 18, 18A)). The line 22C has an enlarged portion 114 sized to be prevented from passing through the receptacle 58C.

In other constructions, structure defining receptacle 58C may be movable (e.g., flexible) relative to other structure to allow movement of the enlarged portion 114 through the receptacle 58C but to inhibit removal during operation of the trimmer T. For example, an upper portion of the wall 50C may move (e.g., flex) relative to the lower portion to allow the enlarged portion 114 to pass from the front face, through the receptacle 58C to the rear face to, thereafter limit movement of the line 22C out of the receptacle 58C.

The illustrated line holder 18C is operable with the retainer 74A described above and shown in FIGS. 20-23. However, in other constructions (not shown), the line holder 18C may be constructed with the retainer 74 shown in FIGS. 9-10.

The structure of the housings 14, 14A, 14C and the line holders 18, 18A, 18B, 18C provide a modular arrangement for the trimmer head 10, 10A, 10C and for the trimmer T. Any of the line holders 18, 18A, 18B, 18C may be used with any of the housings 14, 14A, 14C. One of the line holders 18, 18A, 18B, 18C may replace or substituted for another of the line holders 18, 18A, 18B, 18C. For example, the line holder 18 with the retainer 74 may replace the line holder 18A with the retainer 74A or vice versa. As another example, the line holder 18, 18A, 18B for a folded line 22, 22A may replace the line holder 18C for the straight line 22C or vice versa.

One or more independent features and independent advantages of the invention may be set forth in the following claims:

What is claimed is:

1. A trimmer head for use with a trimmer, the head comprising:
   a housing rotatable about an axis; and
   a line holder supported by the housing, the line holder including a body having a first face and an opposite second face and defining a first receptacle, a second receptacle separated from the first receptacle and an opening communicating with the first receptacle through a first passage and with the second receptacle through a second passage, the first passage being narrower than the first receptacle, the second passage being narrower than the second receptacle, the first receptacle, the second receptacle and the opening extending through the body from the first face to the second face, the line holder being operable to support a line, the line having a first end and an opposite second end, the line being folded to provide a first line section from the first end toward a folded portion and a second line section from the second end toward the folded portion, the folded portion being insertable into the opening through the first face, the first line section being receivable into the first receptacle through the first passage, the second line section being receivable into the second receptacle through the second passage, the first end and the second end extending outwardly from the first face and the folded portion being positioned toward the second face.

2. The head of claim 1, wherein the line holder includes a projection separating the first receptacle from the second receptacle.

3. The head of claim 2, wherein the folded portion is positionable around the projection to retain the line in the line holder.

4. The head of claim 2, wherein the projection has a first side and a second side extending to a free end, the first side defining a portion of the first receptacle and a first undercut, the second side defining a portion of the second receptacle and a second undercut, and the free end defining a portion of the opening, and wherein the first line section is positionable in the first undercut and the second line section is positionable in the second undercut.

5. The head of claim 2, wherein the projection has a free end, and wherein the opening is proximate the free end.

6. The head of claim 1, wherein the line holder includes a wall at least partially defining the first receptacle, the second receptacle and the opening.

7. The head of claim 1, wherein the first receptacle, the opening and the second receptacle are arranged in a V-shape.

8. The head of claim 1, wherein the line holder includes a first wall portion extending between and at least partially defining the opening and the first receptacle and a second wall portion extending between and at least partially defining the opening and the second wall portion, the first wall portion and the second wall portion converging toward the opening.

9. The head of claim 1, wherein the line holder is a first line holder, the line being a first line, and wherein the head further comprises a second line holder supported by the housing, the second line holder being operable to support a second line.

10. The head of claim 9, wherein the second line holder defines a first receptacle, a second receptacle separated from the first receptacle and an opening communicating with the first receptacle and the second receptacle, and wherein the second line has a first end and an opposite second end, the line being folded to provide a first line section from the first end toward a folded intermediate portion and a second line section from the second end toward the folded intermediate portion, the intermediate portion being insertable into the opening, the first line section being receivable in the first receptacle, the second line section being receivable in the second receptacle.

11. The head of claim 1, wherein the housing has a periphery about the axis, and wherein the line is insertable into the line holder from outside of the periphery.

12. A line holder for a trimmer head, the head being for use with a trimmer, the head including a housing rotatable about an axis, the line holder being supportable by the housing, a line being supportable by the line holder, the line having a first end and an opposite second end, the line being folded to provide a first line section from the first end toward a folded portion and a second line section from the second end toward the folded portion, the line holder comprising:
   a body having a first face and an opposite second face and defining a first receptacle, a second receptacle separated from the first receptacle and an opening communicating with the first receptacle through a first passage and with the second receptacle through a second passage, the first passage being narrower than the first receptacle, the second passage being narrower than the second receptacle, the first receptacle, the second receptacle and the opening extending through the body from the first face to the second face, the body including a projection separating the first receptacle from the second receptacle, the folded portion of the line being insertable into the opening through the first face and positionable around the projection, the first line section being receivable into the first receptacle through the first passage, the second line section being receivable into the second receptacle through the second passage, the first end and the second end extending outwardly from the first face and the folded portion being proximate the second face.

13. The line holder of claim 12, wherein the projection has a first side and a second side extending to a free end, the first side defining a portion of the first receptacle and a first undercut, the second side defining a portion of the second receptacle and a second undercut, and the free end defining a portion of the opening, the first line section being positionable in the first undercut and the second line section being positionable in the second undercut.

14. The line holder of claim 12, wherein the projection has a free end, and wherein the opening is proximate the free end.

15. The line holder of claim 12, wherein the line holder includes a wall at least partially defining the first receptacle, the second receptacle and the opening.

16. The line holder of claim 12, wherein the first receptacle, the opening and the second receptacle are arranged in a V-shape.

17. The line holder of claim 12, wherein the line holder includes a first wall portion extending between and at least partially defining the opening and the first receptacle and a second wall portion extending between and at least partially defining the opening and the second wall portion, the first wall portion and the second wall portion converging toward the opening.

18. A method of assembling a trimmer head, the head being for use with a trimmer, the head including a housing, a line holder and a line, the housing being rotatable about an axis and having an outer periphery, the line holder including a body having a first face and an opposite second face and defining a first receptacle, a second receptacle separated from the first receptacle and an opening communicating with the first receptacle through a first passage and with the second receptacle through a second passage, the first passage being narrower than the first receptacle, the second passage being narrower than the second receptacle, the first receptacle, the second receptacle and the opening extending through the body from the first face to the second face, the body including a projection separating the first receptacle from the second receptacle, the line having a first end and an opposite second end, the method comprising:

supporting the line holder on the housing;

folding the line to provide a first line section from the first end toward a folded portion and a second line section from the second end toward the folded portion;

inserting, from beyond the outer periphery, the folded portion into the opening through the first face toward the second face; and thereafter, positioning the folded portion around the projection, the first line section in the first receptacle and the second line section in the second receptacle, the first end and the second end extending outwardly from the first face and the folded portion being proximate the second face, positioning including moving the first line section from the opening through the first passage and into the first receptacle and moving the second line section from the opening through the second passage and into the second receptacle.

* * * * *